United States Patent
Imai et al.

(10) Patent No.: US 8,311,694 B2
(45) Date of Patent: Nov. 13, 2012

(54) CONTROL APPARATUS FOR VEHICULAR POWER TRANSMITTING SYSTEM

(75) Inventors: Keita Imai, Toyota (JP); Tooru Matsubara, Toyota (JP); Kenta Kumazaki, Toyota (JP); Tatsuya Imamura, Okazaki (JP); Atsushi Tabata, Okazaki (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/140,373

(22) PCT Filed: Dec. 17, 2008

(86) PCT No.: PCT/JP2008/072995
§ 371 (c)(1),
(2), (4) Date: Jun. 16, 2011

(87) PCT Pub. No.: WO2010/070750
PCT Pub. Date: Jun. 24, 2010

(65) Prior Publication Data
US 2011/0251747 A1    Oct. 13, 2011

(51) Int. Cl.
*B60L 15/20* (2006.01)
*B60K 1/00* (2006.01)
(52) U.S. Cl. .......................... 701/22; 180/65.1
(58) Field of Classification Search .................... 701/22; 307/9.1, 10.1, 10.6; 477/7; 180/65.21, 65.1; 475/149–150, 5
See application file for complete search history.

(56) References Cited

U.S. PATENT DOCUMENTS

| 7,578,765 | B2  |   | 8/2009 | Tabata et al. |       |
|-----------|-----|---|--------|---------------|-------|
| 7,922,618 | B2  | * | 4/2011 | Matsubara et al. | 477/3 |
| 7,953,538 | B2  | * | 5/2011 | Matsubara et al. | 701/99 |
| 7,970,505 | B2  | * | 6/2011 | Suzuki        | 701/22 |
| 2008/0234885 | A1 | * | 9/2008 | Suzuki      | 701/22 |
| 2009/0023530 | A1 | * | 1/2009 | Iwase et al. | 475/150 |
| 2009/0023547 | A1 | * | 1/2009 | Matsubara et al. | 477/3 |
| 2010/0087287 | A1 | * | 4/2010 | Tabata et al. | 477/3 |
| 2010/0125019 | A1 | * | 5/2010 | Tabata et al. | 477/3 |

FOREIGN PATENT DOCUMENTS

| CN | 101011965 A    | 8/2007  |
| JP | 9-266601 A     | 10/1997 |
| JP | 2003-134602    | 5/2003  |
| JP | 2007-015485 A  | 1/2007  |
| JP | 2007-151336 A  | 6/2007  |
| JP | 2007-186005    | 7/2007  |

(Continued)

*Primary Examiner* — Yonel Beaulieu
(74) *Attorney, Agent, or Firm* — Sughrue Mion, PLLC

(57) ABSTRACT

A vehicular power transmitting system, which permits the power transmitting system to provide a sufficient vehicle drive force even when an input of an electric energy into an electric-energy storage device is restricted and which reduces the electric efficiency of at least one of an first electric motor and a second electric motor, when an input of an electric energy into a chargeable electric-energy storage device is restricted, during an operation of an engine. This provides a vehicle drive force and generation of the electric energy by at least one of the first electric motor and the second electric motor, so that the amount of electric energy generated by the first electric motor is reduced, and/or the amount of electric energy consumed by the second electric motor is increased, whereby a sufficient vehicle drive force can be obtained even when the input into the electric-energy storage device is restricted.

7 Claims, 12 Drawing Sheets

FOREIGN PATENT DOCUMENTS

| | | |
|---|---|---|
| JP | 2007-190972 A | 8/2007 |
| JP | 2008-049775 A | 3/2008 |
| JP | 2008-179280 A | 8/2008 |
| JP | 2008-195160 A | 8/2008 |
| JP | 2008-201182 A | 9/2008 |
| JP | 2009-202535 A | 9/2009 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  |  |  |  |  |  |  |  |  |

○ ENGAGED

◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | | | | | | | | |

○ ENGAGED

◎ ENGAGED FOR STEP-VARIABLE SHIFTING, AND RELEASED FOR CONTINUOUSLY-VARIABLE SHIFTING

CONTROL APPARATUS FOR VEHICULAR POWER TRANSMITTING SYSTEM

This application is a National Stage of International Application No. PCT/JP2008/072995 filed Dec. 17, 2008, the contents of all of which are incorporated herein by reference in their entirety.

TECHNICAL FIELD

The present invention relates to a control apparatus for a vehicular power transmitting system, and more particularly to a control apparatus which permits the vehicular power transmitting system to provide a sufficient drive force when a vehicle is required to run with a large drive force.

BACKGROUND ART

There is known a vehicular power transmitting system including an electrically controlled differential portion having a differential mechanism connected to a power transmitting path between an engine and a vehicle drive wheels, and a first electric motor which is operatively connected to the differential mechanism and an operating state of which is controlled to control a differential state of the differential mechanism, and further including a second electric motor operatively connected to the above-indicated drive wheels, and a transmission portion which constitutes a part of the power transmitting path. In this vehicular power transmitting system, the operating state of the differential mechanism is controlled with the operating state of the first electric motor being controlled, namely, with the first electric motor being switched to one of its different operating states including an electricity generating state, a drive force generating state and an idling state.

When the first electric motor is placed in its electricity generating state, an electric energy generated by the first electric motor is not only used to operate the second electric motor, but also is stored in a chargeable electric-energy storage device.

An amount of electric energy to be stored in the electric-energy storage device is controlled to prevent excessive charging and discharging of the electric-energy storage device, so as to keep the electric-energy storage device in a predetermined state of charge (SOC), for maintaining the performance of the electric-energy storage device. Accordingly, the amount of electric energy that can be stored in the electric-energy storage device is reduced (restricted) as the amount of electric energy stored in the electric-energy storage device approaches a predetermined upper limit.

For the reason described above, the electric energy generated by the above-indicated first electric motor may not be sufficiently consumed by the operation of the second electric motor and the charging of the electric-energy storage device. On the other hand, reduction of the amount of electric energy to be generated by the first electric motor may cause a change of the operating state of the above-indicated differential mechanism, resulting in a possibility of failure of the vehicular power transmitting system to provide a sufficient vehicle drive force.

Patent Document 1 discloses a technique to operate an optional device for consumption of the electric energy by the optional device, for preventing excessive charging of the electric-energy storage device when the amount of electric energy to be stored in the electric-energy storage device is restricted or limited while the vehicle is required to run with a drive force larger than usual, for instance, in an uphill running of the vehicle.

Patent Document 1: JP-2007-186005 A

DISCLOSURE OF THE INVENTION

Object Achieved by the Invention

Upon starting of the vehicle, for example, however, the operating speed of the second electric motor operatively connected to the above-indicated drive wheels is zero or low according to the vehicle running speed, so that the amount of consumption of the electric energy by the second electric motor is small. Thus, the amount of electric energy generated by the first electric motor is not sufficiently, consumed when the amount of electric energy to be stored in the electric-energy storage device is restricted. Therefore, there is still a possibility of failure to ensure sufficient vehicle starting performance. In addition, the amount of electric energy generated by the first electric motor may further increase as a result of an increase of a drive torque produced by the engine and second electric motor in an uphill or other high-load running of the vehicle, which requires a drive force larger than in a flat-road running of the vehicle.

The present invention was made in view of the background art described above. It is therefore an object of the present invention to provide a control apparatus for a vehicular power transmitting system, which permits the vehicular power transmitting system to provide a sufficient vehicle drive force even when the amount of electric energy to be stored in the electric-energy storage device is limited.

Means for Achieving the Object

The object indicated above is achieved according to the invention of claim 1, which provides (a) a control apparatus for a vehicular power transmitting system including an electrically controlled differential portion having a differential mechanism connected to a power transmitting path between an engine and a drive wheel of a vehicle, and a first electric motor operatively connected to the above-indicated differential mechanism such that a differential state of the above-indicated differential mechanism is controllable by controlling an operating state of the above-indicated first electric motor, a second electric motor operatively connected to the above-indicated drive wheel, and a transmission portion which constitutes a part of the above-indicated power transmitting path, the control apparatus being characterized by:

(b) reducing an electric efficiency of at least one of the above-indicated first electric motor and the above-indicated second electric motor, when an input of an electric energy into a chargeable electric-energy storage device is restricted, during an operation of the above-indicated engine to provide a vehicle drive force and generation of the electric energy by at least one of the above-indicated first electric motor and the above-indicated second electric motor;

(c) providing the above-indicated electrically controlled differential portion with a differential limiting device configured to disable and enable the above-indicated differential mechanism to perform a differential action, for thereby switching the above-indicated vehicular power transmitting system between a step-variable shifting state in which the speed ratio is variable in steps, and a continuously-variable shifting state in which the speed ratio is continuously variable; and (d) placing the above-indicated differential limiting device in a slipping state when a sufficient vehicle drive force cannot be obtained by the reduction of the above providing said electrically controlled differential portion with a differential limiting device configured to disable and enable said differential mechanism to perform a differential action, for thereby switching the above-indicated vehicular power transmitting system between a step-variable shifting state in which the speed ratio is variable in steps, and a continuously-variable shifting state in which the speed ratio is continuously variable; and (d) placing said differential limiting device in a slipping state when a sufficient vehicle drive force cannot be obtained by the reduction of the above-indicated electric efficiency.

The control apparatus constructed according to the invention of claim 1 is configured to reduce the electric efficiency of at least one of the above-indicated first electric motor and the above-indicated second electric motor, when the input of the electric energy into the chargeable electric-energy storage device is restricted, during the operation of the above-indicated engine to provide the vehicle drive force and generation of the electric energy by at least one of the above-indicated first electric motor and the above-indicated second electric motor, so that the amount of electric energy generated by the first electric motor is reduced, and/or the amount of electric energy consumed by the second electric motor is increased, whereby a sufficient vehicle drive force can be obtained even when the input into the electric-energy storage device is restricted. Further, the sufficient vehicle drive force can be obtained owing to electric energy consumption by the slipping action of the above-indicated differential limiting device, even when the input into the above-indicated electric-energy storage device is restricted.

The control apparatus is preferably characterized in that the above-indicated electric efficiency is reduced by an amount which increases with an increase of a load of the vehicle. Since the amount of reduction of the above-indicated electric efficiency is increased as the vehicle load such as the vehicle weight or a towing load of the vehicle is increased, a sufficient vehicle drive force can be obtained even when a large vehicle drive force is required due to the large vehicle load. Further, it is possible to minimize the degree of reduction of the fuel economy due to the reduction of the electric efficiency.

The control apparatus is preferably further characterized in that the above-indicated electric efficiency is reduced by an amount which increases with a decrease of a permissible amount of input of the electric energy into the above-indicated electric-energy storage device. Since the amount of reduction of the above-indicated electric efficiency is increased as the permissible amount of input of the electric energy into the above-indicated electric-energy storage device is decreased, a sufficient vehicle drive force can be obtained even when the input of the electric energy into the electric-energy storage device is greatly restricted, and the generated electric energy is difficult to be consumed. Further, it is possible to minimize the degree of reduction of the fuel economy due to the reduction of the electric efficiency.

The control apparatus is preferably further characterized in that the reduction of the above-indicated electric efficiency is implemented for a period of time from a moment of starting of the vehicle to a moment at which the vehicle speed has been raised to a predetermined reduction termination threshold value. In this case, a sufficient vehicle drive force can be obtained even when the amount of consumption of the electric energy by the electric motor is small especially while the vehicle speed is low. Further, since the reduction of the above-indicated electric efficiency is terminated when the vehicle speed has been raised to the predetermined threshold value, it is possible to reduce the amount of heat generation due to the reduction of the electric efficiency.

The control apparatus preferably further characterized in that the reduction of the above-indicated electric efficiency is implemented while the engine is in a predetermined range of its torque. In this case, the reduction of the electric efficiency is implemented when the engine torque in the predetermined range is required, that is, when the required vehicle drive force in a predetermined range is required, so that the required vehicle drive force can be obtained. Further, it s possible to minimize the degree of reduction of the fuel economy due to the reduction of the electric efficiency.

The control apparatus is preferably further characterized in that the reduction of the above-indicated electric efficiency is implemented by changing a manner of application of an electric current to operate the above-indicated at least one of the first electric motor and the second electric motor. Since the electric efficiency of the above-indicated at least one of the first electric motor and the second electric motor can be reduced by changing the manner of application of the electric current to operate the above-indicated at least one of the first electric motor and the second electric motor, a sufficient vehicle drive force can be obtained even when the input of the electric energy into the electric-energy storage device is restricted.

The control apparatus is preferably further characterized in that the reduction of the above-indicated electric efficiency is implemented by changing an operating point of the above-indicated at least one of the first electric motor and the second electric motor. Since the electric efficiency of the above-indicated at least one of the first electric motor and the second electric motor can be reduced by changing the operating point of the above-indicated at least one of the first electric motor and the second electric motor, a sufficient vehicle drive force can be obtained even when the input of the electric energy into the electric-energy storage device is restricted.

The control apparatus is preferably further characterized in that the reduction of the electric efficiency is implemented while the temperature of at least one of the first electric motor and the second electric motor is in a predetermined permissible range, so that the reduction of the electric efficiency has an advantage of preventing deterioration of the durability and performance of the first electric motor and the second electric motor due to a rise of their temperatures caused by the reduction of the electric efficiency, in addition to an advantage of obtaining a sufficient vehicle drive force even when the input of the electric energy into the electric-energy storage device is restricted.

The control apparatus is preferably further characterized in that an electric load provided outside the vehicular power transmitting system is actuated to consume the electric energy generated by the above-indicated first electric motor, when a sufficient vehicle drive force cannot be obtained by the reduction of the above-indicated electric efficiency. The present control apparatus has an advantage of obtaining the sufficient vehicle drive force owing to the electric energy consumption by the electric load provided outside the vehicular power transmitting system even when the input of the electric energy into the electric energy storage device is restricted, in addition to an advantage of reducing the amount of electric energy generated by the first electric motor and/or increasing the amount of electric energy consumed by the second electric motor, owing to the reduction of the above-indicated electric efficiency.

Preferably, the above-indicated electrically controlled differential portion is provided with a differential limiting device configured to disable and enable the above-indicated differential mechanism to perform a differential action, for thereby switching the above-indicated vehicular power transmitting system between a step-variable shifting state in which the speed ratio is variable in steps and a continuously-variable shifting state in which the speed ratio is variable continuously, and the above-indicated transmission portion is constituted by a step-variable transmission constructed to have a selected one of a predetermined plurality of speed ratios. When the differential mechanism is enabled by the differential limiting device to perform the differential action, namely, switched to a continuously-variable shifting state, the vehicular power transmitting system is placed in the continuously-variable shifting state wherein the speed ratio, which is a ratio of the rotating speed of the input shaft of the above-indicated electrically controlled differential portion to the rotating speed of the output shaft of the transmission portion, is continuously variable. Accordingly, a hybrid vehicle provided with the above-indicated differential limiting device to switch the power transmitting system between the step-variable shifting state and the continuously-variable shifting state has not only an advantage of reduced shifting shock, but also an advantage of reduced deterioration of fuel economy.

NOMENCLATURE OF ELEMENTS

Figures 1, 2:
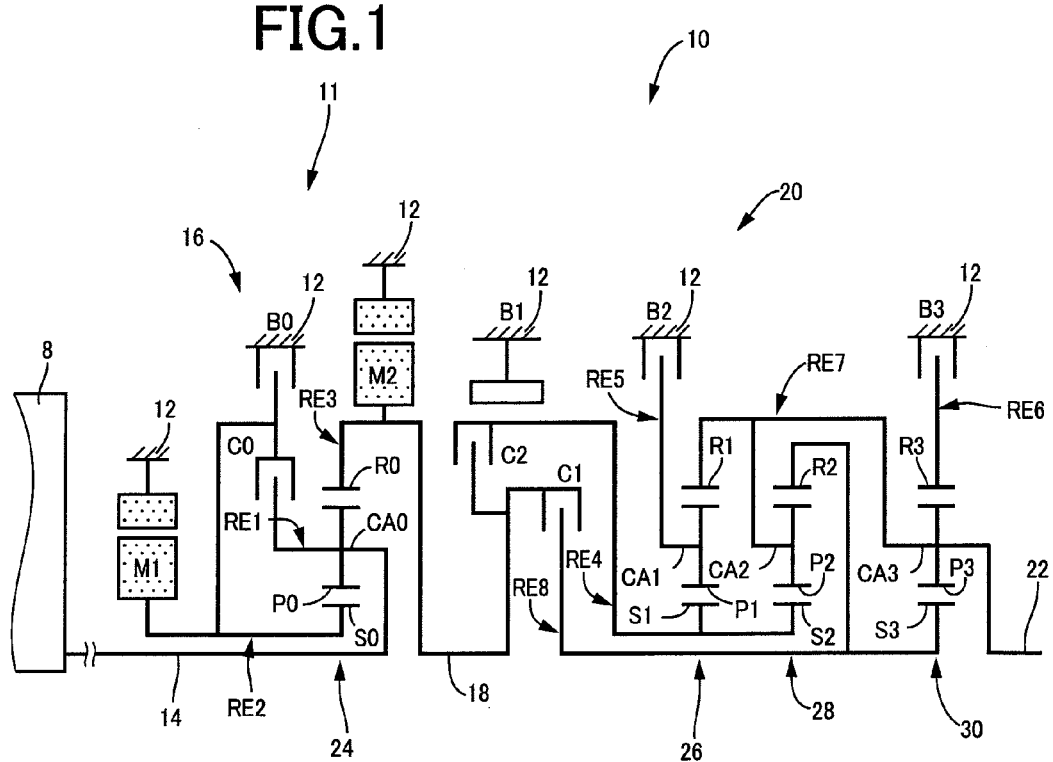
FIG. 1 is a schematic view for explaining an arrangement of a vehicular power transmitting system controlled by a control apparatus of the present invention.
FIG. 2 is a table indicating shifting actions of the vehicular power transmitting system of FIG. 1, which is operable in a continuously-variable or step-variable shifting state, in relation to different combinations of operating states of hydraulically operated frictional coupling devices to effect the respective shifting actions.

8: Engine
10: Vehicular power transmitting system
11: Electrically controlled differential portion
16: Differential mechanism (Power distributing mechanism)
20: Transmission portion (Automatic transmission portion)
38: Drive wheels
40: Control apparatus (Electronic control device) for the vehicular power transmitting system
68: Charging restriction determining means
72: Vehicle weight sensor
80: Electric efficiency reducing means
82: Current phase changing means
84: Engine-operating-point changing means (First-motor-operating-point changing means)
90: Second-motor-operating-point changing means
M1: First electric motor
M2: Second electric motor

BEST MODE FOR CARRYING OUT THE INVENTION

Embodiments of the present invention will be described in detail by reference to the drawings. It is to be understood that the drawings showing the embodiments are simplified or transformed as needed, and do not necessarily accurately represent the dimensions and shapes of the elements of the embodiments.

Embodiment 1

A control apparatus according to the present invention is used for a hybrid vehicle, for example. FIG. 1 is a schematic view for explaining a vehicular power transmitting system 10 (hereinafter referred to as "power transmitting system 10") controlled by the control apparatus of the invention. In FIG. 1, the power transmitting system 10 includes: an input rotary member in the form of an input shaft 14; a differential portion 11 connected to the input shaft 14 either directly, or directly via a pulsation absorbing damper (vibration damping device) not shown; an automatic transmission portion (transmission portion) 20 disposed in a power transmitting path between the differential portion 11 and drive wheels 38 (shown in FIG. 6) of the vehicle, and connected in series via a power transmitting member (power transmitting shaft) 18 to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as "casing 12") functioning as a stationary member attached to a body of the vehicle, and are connected in series with each other. This power transmitting system 10 is suitably used for a longitudinal FR vehicle (front-engine, rear-drive vehicle), and is disposed between a drive power source in the form of an internal combustion engine 8, and the pair of drive wheels 38 (shown in FIG. 6), to transmit a vehicle drive force from the engine 8 to the pair of drive wheels 38 through a differential gear device (final speed reduction gear) 36 and a pair of drive axles. The engine 8 may be a gasoline engine or diesel engine and functions as the vehicle drive power source directly connected to the input shaft 14 or directly via the pulsation absorbing damper not shown. The differential gear device 36 constitutes a part of the power transmitting path.

In the present power transmitting system 10, the engine 8 and the differential portion 11 are connected directly to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in FIG. 1.

The differential portion 11 is provided with: a first electric motor M1; a power distributing mechanism 16 functioning as a differential mechanism to which the first electric motor M1 is operatively connected and which is operable to mechanically distribute an output of the engine 8 received by the input shaft 14, to the first electric motor M1 and the power transmitting member 18; and a second electric motor M2 which is rotated with the power transmitting member 18. Each of the first and second electric motors M1 and M2 is a so-called motor/generator having also a function of an electric generator. However, the first electric motor M1 which functions as a differential electric motor for controlling a differential state of the power distributing mechanism 16 has at least an electricity generating function for generating a reaction force, while the second electric motor M2, which is connected operatively to the drive wheels 38, has at least a vehicle driving motor function, serving as a vehicle drive power source operable to produce a vehicle drive force. The first and second electric motors M1 and M2 are disposed within the casing 12, which is a housing of the power transmitting system 10, and is cooled with a working oil of the automatic transmission portion 20, that is, the working fluid used for the power transmitting system 10.

The power distributing mechanism 16, which is a differential mechanism connected to and between the engine 8 and the drive wheels 38, includes as major components a differential-portion planetary gear set 24 of a single pinion type having a predetermined gear ratio $\rho 0$ of about 0.418, for example, a switching clutch C0 and a switching brake B0. The differential-portion planetary gear set 24 has rotary elements (elements) consisting of: a differential-portion sun gear S0, a differential-portion planetary gear P0; a differential-portion carrier CA0 supporting the differential-portion planetary gear P0 such that the differential-portion planetary gear P0 is rotatable about its axis and about the axis of the differential-portion sun gear S0; and a differential-portion ring gear R0 meshing with the sun gear S0 through the differential-portion planetary gear P0. Where the numbers of teeth of the differential-portion sun gear S0 and the differential-portion ring gear R0 are represented by ZS0 and ZR0, respectively, the above-indicated gear ratio $\rho 0$ is represented by ZS0/ZR0.

In the present power distributing mechanism 16, the differential portion carrier CA0 is connected to the input shaft 14, that is, to the engine 8, and the differential-portion sun gear S0 is connected to the first electric motor M1, while the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. When the switching clutch C0 and brake B0 are both released, the power distributing mechanism 16 is placed in a differential state in which three elements of the differential-portion planetary gear set 24 consisting of the differential-portion sun gear S0, carrier CA0 and ring gear R0 are rotatable relative to each other, so as to be placed in a differential state where a differential function is performed, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in a so-called continuously-variable shifting state (electrically established CVT state), in which the differential portion 11 is operated as an electrically controlled differential device and in which the rotating speed of the power transmitting member 18 is continuously variable, irrespective of the operating speed of the engine 8. Namely, when the power distributing mechanism 16 is placed in the differential state, the differential portion 11 is also placed in the differential state, and is placed in the continuously-variable shifting state in which the differential portion 11 functions as an electrically controlled continuously variable transmission the speed ratio $\gamma 0$ (rotating speed of the input shaft 14/rotating speed of the power transmitting member 18) is continuously variable from a minimum value $\gamma 0 \min$ to a maximum value $\gamma 0 \max$. When the power distributing mechanism 16 is placed in the differential state, the differential state of the power distributing mechanism 16, that is, the differential state between the rotating speed of the input shaft 14 and the rotating speed of the power transmitting member 18 is controlled by controlling the operating state of the first electric motor M1 and/or the operating state of the second electric motor M2 operatively connected to the power distributing mechanism 16.

When the switching clutch C0 or brake B0 is engaged while the power distributing mechanism 16 is placed in the continuously-variable shifting state, the power distributing mechanism 16 is brought into a non-differential state in which the differential function is not performed, i.e., the differential function is not available. Described in detail, when the switching clutch C0 is engaged, the differential-portion sun gear S0 and the differential-portion carrier CA0 are connected together, so that the power distributing mechanism 16 is placed in a locked state in which the three rotary elements of the differential-portion planetary gear set 24 consisting of the differential-portion sun gear S0, carrier CA0 and ring gear R0 are rotatable as a unit, namely, placed in a non-differential state in which the differential function is not available, so that the differential portion 11 is also placed in a non-differential state. In this non-differential state, the operating speed of the engine 8 and the rotating speed of the power transmitting member 18 are made equal to each other, so that the differential portion 11 (power distributing mechanism 16) is placed in a fixed-speed-ratio shifting state or step-variable shifting state in which the power distributing mechanism 16 functions as a transmission having a fixed speed ratio $\gamma 0$ equal to 1. When the switching brake B0 is engaged in place of the switching clutch C0, the differential-portion sun gear S0 is fixed to the casing 12, so that the power distributing mechanism 16 is placed in the locked state in which the differential-portion sun gear S0 is not rotatable, namely, placed in a non-differential state in which the differential function is not available, so that the differential portion 11 is also placed in the non-differential state. Since the rotating speed of the differential-portion ring gear R0 is made higher than that of the differential-portion carrier CA0, the differential portion 11 is placed in the fixed-speed-ratio shifting state or step-variable shifting state in which differential portion 11 (the power distributing mechanism 16) functions as a speed-increasing mechanism having a fixed speed ratio $\gamma 0$ smaller than 1, for example, about 0.7.

Thus, the above-described switching clutch C0 and brake B0 function as a differential-state switching device operable to selectively switch the differential portion 11 (power distributing mechanism 16) between the differential state, namely, non-locked state, and the non-differential state, namely, locked state, that is, between the differential state in which the differential portion 11 (the distributing mechanism 16) is operable as an electrically controlled differential mechanism, that is, the continuously-variable shifting state in which the differential portion 11 is operable to perform continuously variable shifting electrically as a continuously variable transmission the speed ratio of which is continuously variable, and the locked state in which the differential portion 11 is not operable to perform continuously variable shifting electrically, that is, the differential portion is not operable as the electrically controlled continuously variable transmission in which a continuously-variable shifting operation is not performed, and in which the speed ratio of the differential portion 11 is held fixed, namely, the fixed-speed-ratio shifting state (non-differential state) in which the differential portion 11 does not perform or is not capable of electrically controlled continuously-variable shifting, and, in which the differential portion 11 is operable as a transmission having a single gear position with one speed ratio or two or more gear positions with respective speed ratios, namely, the fixed-speed-ratio shifting state in which the differential portion 11 serves as a transmission having a single gear position with one fixed speed ratio or a plurality of gear positions with respective fixed speed ratios.

The automatic transmission portion 20 functions as a step-variable automatic transmission the speed ratio of which (rotating speed $N_{18}$ of the power transmitting member 18/rotating speed $N_{OUT}$ of the output shaft 22) is variable in steps, and is a step-variable transmission portion which constitutes a part of the power transmitting path between the engine 8 and the drive wheels 38. The automatic transmission portion 20 includes a single-pinion type first planetary gear set 26, a single-pinion type second planetary gear set 28 and a single-pinion type third planetary gear set 30. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a predetermined gear ratio $\rho 1$ of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a predetermined gear ratio $\rho 2$ of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a predetermined gear ratio $\rho 3$ of about 0.421. Where the numbers of teeth of the first sun gear S1, firs ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios $\rho 1$, $\rho 2$ and $\rho 3$ are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other as a unit and fixed to the output shaft 22. The second ring gear R2 and the third sun gear S3 are integrally fixed to each other as a unit and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 are hydraulically operated frictional coupling devices (hereinafter, may be explained as simply "coupling device") used in a conventional vehicular step-variable automatic transmission. Each of these frictional coupling devices is constituted by a wet-type multiple-disc clutch including a plurality of friction plates which are forced against each other by a hydraulic piston, or a band brake including a rotary drum and one band or two bands which is/are wound on the outer circumferential surface of the rotary drum and tightened at one end by a hydraulic piston. Each of those frictional coupling devices is selectively engaged for connecting two members between which each clutch or brake is interposed. Each of the frictional coupling devices is provided with a hydraulic pressure sensor disposed at a position along a hydraulic passage, which is as close to the hydraulic piston as possible, to accurately detect a hydraulic pressure value $P_{CX}$ of the hydraulic piston. The first clutch C1, second clutch C2, first brake B1, second brake B2 and third brake B3 provided in the automatic transmission portion 20 correspond to shifting actuators hydraulically operated to shift the automatic transmission portion 20.

The power transmitting system 10 constructed as described above is placed in a selected one of a first gear position (first speed position) through a fifth gear position (fifth speed position), a reverse gear position (backward drive position) and a neural position, by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. The above-indicated positions have respective speed ratios γ (input shaft rotation speed $N_{IN}$/output shaft rotation speed $N_{OUT}$) which change as substantially geometric series. The power distributing mechanism 16 provided in the present embodiment is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present power transmitting system 10, therefore, the differential portion 11 placed in the fixed-speed-ratio shifting state by the engaging action of one of the switching clutch C0 and switching brake B0 cooperates with the automatic transmission portion 20 to constitute a step-variable state in which the differential portion 11 and the automatic transmission portion 20 serve as a step-variable transmission device, while the differential portion 11 placed in the continuously-variable shifting state with the switching clutch C0 and switching brake B0 being both held in the released state cooperates with the automatic transmission portion 20 to constitute a continuously variable shifting state in which the differential portion 11 and the automatic transmission portion 20 serve as an electrically controlled continuously variable transmission device. In other words, the power transmitting system 10 is placed in its step-variable shifting state by engaging one of the switching clutch C0 and switching brake B0, and in its continuously-variable shifting state by releasing both of the switching clutch C0 and switching brake B0. Similarly, the differential portion 11 may be considered to be a transmission selectively placed in one of its step-variable and continuously-variable shifting states.

Where the power transmitting system 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing all of the clutches C0, C1, C2 and brakes B0, B1, B2, B3.

Where the power transmitting system 10 functions as the continuously-variable transmission with the differential portion 11 placed in its continuously-variable shifting state, on the other hand, the switching clutch C0 and the switching brake B0 indicated in FIG. 2 are both released. Therefore the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in each selected gear position that is each of 1st, 2nd, 3rd and 4th gear positions, namely, the rotating speed of the power transmitting member 18 is continuously changed, so that the speed ratio of the power transmitting system when the automatic transmission portion 20 is placed in the selected gear position is continuously variable over a predetermined range. Accordingly, the overall speed ratio total speed ratio γT of the entire power transmitting system 10 is continuously variable.

Figure 3:
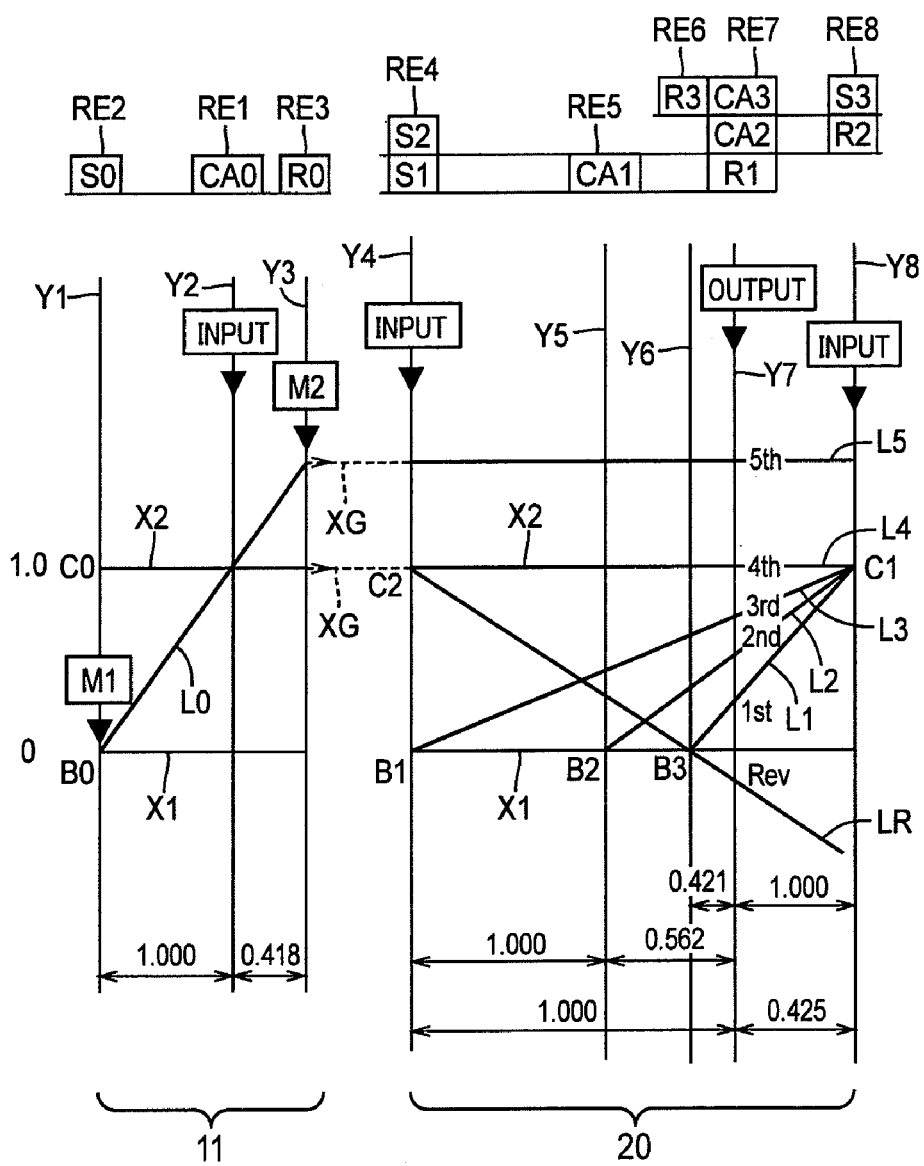
FIG. 3 is a collinear chart indicating relative rotating speeds of the vehicular power transmitting system of FIG. 1 operated in the step-variable shifting state, in different gear positions of the power transmitting system.

The collinear chart of FIG. 3 indicates, by straight lines, a relationship among the rotating speeds of the rotary elements in each of the gear positions of the power transmitting system 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the differential-portion sun gear S0, a first rotary element (first element) RE1 in the form of the differential-portion carrier CA0, and a third rotary element (third element) RE3 in the form of the differential-portion ring gear R0. The distances between the adjacent ones of the vertical lines Y1, Y2 and Y3 are determined by the gear ratio $\rho 0$ of the planetary gear set 24. Further, five vertical lines Y4, Y5, Y6, Y7 and Y8 corresponding to the automatic transmission portion 20 respectively represent the relative rotating speeds of a fourth rotary element (fourth element) RE4 in the form of the first and second sun gears S1, S2 integrally fixed to each other, a fifth rotary element (fifth element) RE5 in the form of the first carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios $\rho 1$, $\rho 2$ and $\rho 3$ of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio $\rho$. In the differential portion 11, the distance between the vertical lines Y1 and Y2 corresponds to "1", while the distance between the vertical lines Y2 and Y3 corresponds to the gear ratio $\rho 0$. In the automatic transmission portion 20, the distance between the sun gear and carrier of each of the first, second and third planetary gear sets 26, 28, 30 corresponds to "1", while the distance between the carrier and ring gear of each planetary gear set 26, 28, 30 corresponds to the gear ratio $\rho$.

Referring to the collinear chart of FIG. 3, the power distributing mechanism 16 (differential portion 11) of the power transmitting system 10 is arranged such that the first rotary element RE1 (differential-portion carrier CA0) of the differential-portion planetary gear set 24 is integrally fixed to the input shaft 14, that is, to the engine 8, and is selectively connected to the second rotary element RE2 (differential-portion sun gear S0) through the switching clutch C0, and this second rotary element RE2 is fixed to the first electric motor M1 and selectively fixed to the casing 12 through the switching brake B0, while the third rotary element RE3 (differential-portion ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the differential-portion sun gear S0 and the differential-portion ring gear R0 is represented by an inclined straight line L0 which passes a point of intersection between the lines Y2 and X2.

When the power transmitting system 10 is brought into the continuously-variable shifting state (differential state) by releasing actions of the switching clutch C0 and brake B0, for instance, the rotating speed of the differential-portion sun gear S0 represented by a point of intersection between the straight line L0 and the vertical line Y1 is raised or lowered by controlling the operating speed of the first electric motor M1, so that the rotating speed of the differential-portion carrier CA0 represented by a point of intersection between the straight line L0 and the vertical line Y2 is raised or lowered, if the rotating speed of the differential-portion ring gear R0 determined by the vehicle speed V is substantially held constant. When the switching clutch C0 is engaged, the differential-portion sun gear S0 and the differential-portion carrier CA0 are connected to each other, and the power distributing mechanism 16 is placed in the non-differential state in which the above-indicated three rotary elements are rotated as a unit, so that the straight line L0 is aligned with the horizontal line X2, and the power transmitting member 18 is rotated at a speed equal to the engine speed $N_E$. When the switching brake B0 is engaged, on the other hand, the rotary motion of the differential-portion sun gear S0 is stopped, and the power distributing mechanism 16 is placed in the non-differential state in which the power distributing mechanism 16 functions as a speed-increasing mechanism, so that the straight line L0 is inclined in the state indicated in FIG. 3, whereby the rotating speed of the differential-portion ring gear R0 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

In the automatic transmission portion 20, the rotating speed of the output shaft 22 in the first gear position established by the engaging actions of the first clutch C1 and the third brake B3 is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching brake B0 is engaged in place of the switching clutch C0, the eighth rotary element RE8 is rotated at a speed higher than the engine speed $N_E$, with the drive force received from the differential portion 11. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
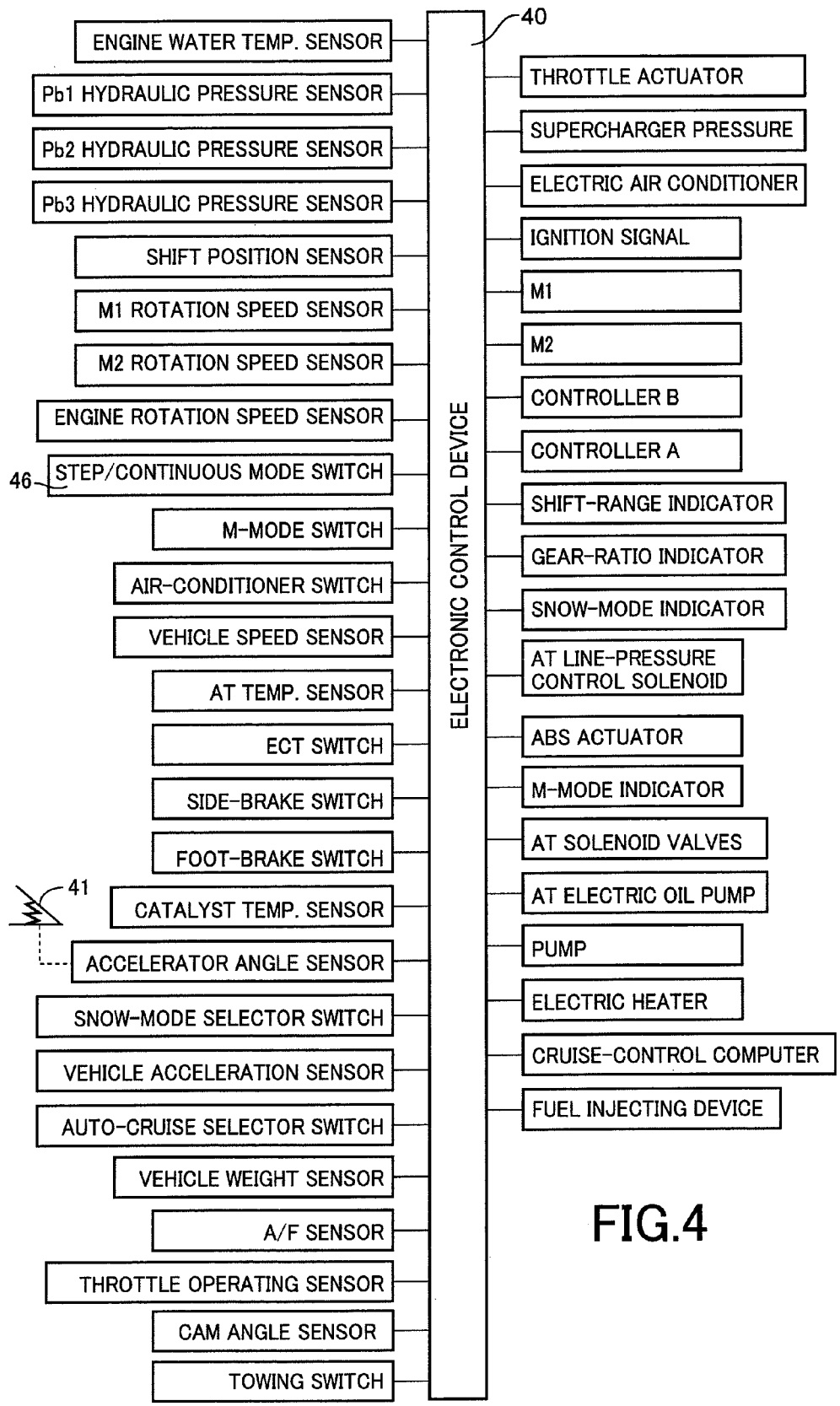
FIG. 4 is a view indicating input and output signals of an electronic control device provided for controlling the power transmitting system of FIG. 1.

FIG. 4 indicates signals received by an electronic control device 40 which is provided as the control apparatus to control the power transmitting system 10 according to the present invention, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and first and second electric motors M1 and M2, and drive controls such as shifting controls of the automatic transmission portion 20.

The electronic control device 40 is arranged to receive from various sensors and switches shown in FIG. 4, various signals such as: a signal indicative of a temperature $TEMP_W$ of engine cooling water; a signal indicative of a selected one of shift positions $P_{SH}$ of a shift lever; signals indicative of hydraulic pressures of the hydraulic pistons (engaging pressures) of the hydraulically operated frictional coupling devices (clutches C and brakes B) in the differential portion 11 or the automatic transmission portion 20, such as a first brake hydraulic pressure Pb1, a second brake hydraulic pressure Pb2, and a second clutch hydraulic pressure Pc2; a signal indicative of an operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of the operating speed $N_E$ of the engine 8; an output signal indicating a state of a step/continuous mode switch 46 provided as a manually operable shifting-state selecting device manually operated by a vehicle operator and disposed near an operator's seat, to select the continuously-variable shifting state and step-variable shifting state of the power transmitting system 10; a command signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of the working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of an accelerator pedal 41, which represents a vehicle output amount required by the vehicle operator; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; a signal indicative of an air/fuel (A/F) ratio of the engine 8; and an output signal indicating a state of a towing switch operated by the vehicle operator when a large vehicle drive force is required, for example, for towing another vehicle.

The electronic control device 40 is further arranged to generate various signals such as: a drive signal to drive a throttle actuator 97 for controlling an opening angle $\theta_{TH}$ of an electronic throttle valve 96 disposed in an intake pipe 95 of the engine 8; a signal to control an amount of injection of a fuel by a fuel injecting device 98 into cylinders of the engine 8; a signal to be applied to an ignition device 99 to control the ignition timing of the engine 8; a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 6) provided to control the hydraulic pistons of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

Figure 5:
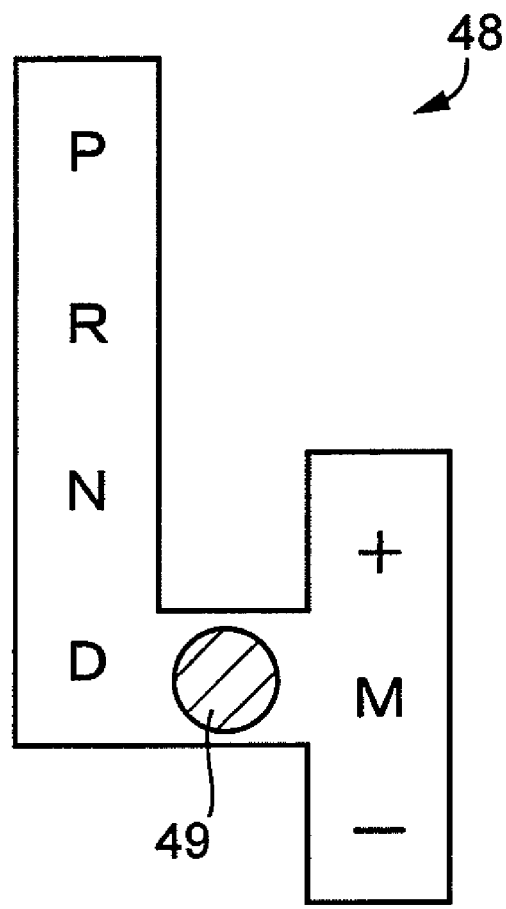
FIG. 5 shows an example of a shifting device provided with a shift lever and manually operable to select a plurality of shift positions.

FIG. 5 shows an example of a manually operable shifting device in the form of a shifting device 48 for selecting one of the plurality of shift positions $P_{SH}$. The shifting device 48 includes the above-described shift lever 49, which is disposed laterally adjacent to the operator's seat, for example, and which is manually operated to select one of the plurality of shift positions $P_{SH}$.

The shift lever 49 is manually operated to: a parking position P for placing the power transmitting system 10, more precisely, the automatic transmission portion 20, in a neutral state in which the power transmitting path is disconnected and in which the output shaft 22 of the automatic transmission portion 20 is locked; a reverse position R for driving the vehicle in the rearward direction; a neutral position N for placing the power transmitting system 10 in the neutral state in which the power transmitting path is disconnected; an automatic forward-drive shifting position D; and a manual forward-drive shifting position M. In the automatic forward-drive shifting position D of the shift lever 49, the power transmitting system 10 is placed in an automatic shifting mode in which the overall speed ratio $\gamma T$ is automatically changed. In the manual forward-drive shifting position M of the shift lever 49, the power transmitting system 10 is placed in a manual shifting mode in which the highest gear position to which the automatic transmission portion 20 is automatically shiftable can be limited, that is, in which a transmission range is set.

When the shift lever 49 is manually operated to a selected one of the shift positions $P_{SH}$ indicated above, the hydraulic control unit 42 is electrically switched to establish the reverse-drive position R, the neutral position N, or one of the gear positions selectable in the forward-drive shifting position D, as indicated in the table of FIG. 2.

Of the shift positions $P_{SH}$ consisting of the above-indicated positions P through M, the parking position P and the neutral position N are non-drive positions selected when the vehicle is not driven. These non-drive positions P, N, are selected to switch to the power cut-off state of the power transmitting path using first clutch C1 and second clutch C2, that is, the power transmitting path in the automatic transmission portion 20 is in the power cut-off state established by releasing both of the clutches C1 and C2, as shown in the table of FIG. 2, to disable the automatic transmission portion 20 to drive the vehicle. The reverse-drive position R, and the automatic and manual forward-drive positions D, M are drive positions selected when the vehicle is driven. These drive positions R, D, M, are selected to switch to the power transmitting state using first clutch C1 and/or second clutch C2, that is, he power transmitting path in the automatic transmission portion 20 is in the power transmitting state established by engaging at least one of the clutches C1 and C2, as shown in the table of FIG. 2, to enable the automatic transmission portion 20 to drive the vehicle.

Described in detail, a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cut-off state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

Figure 6:
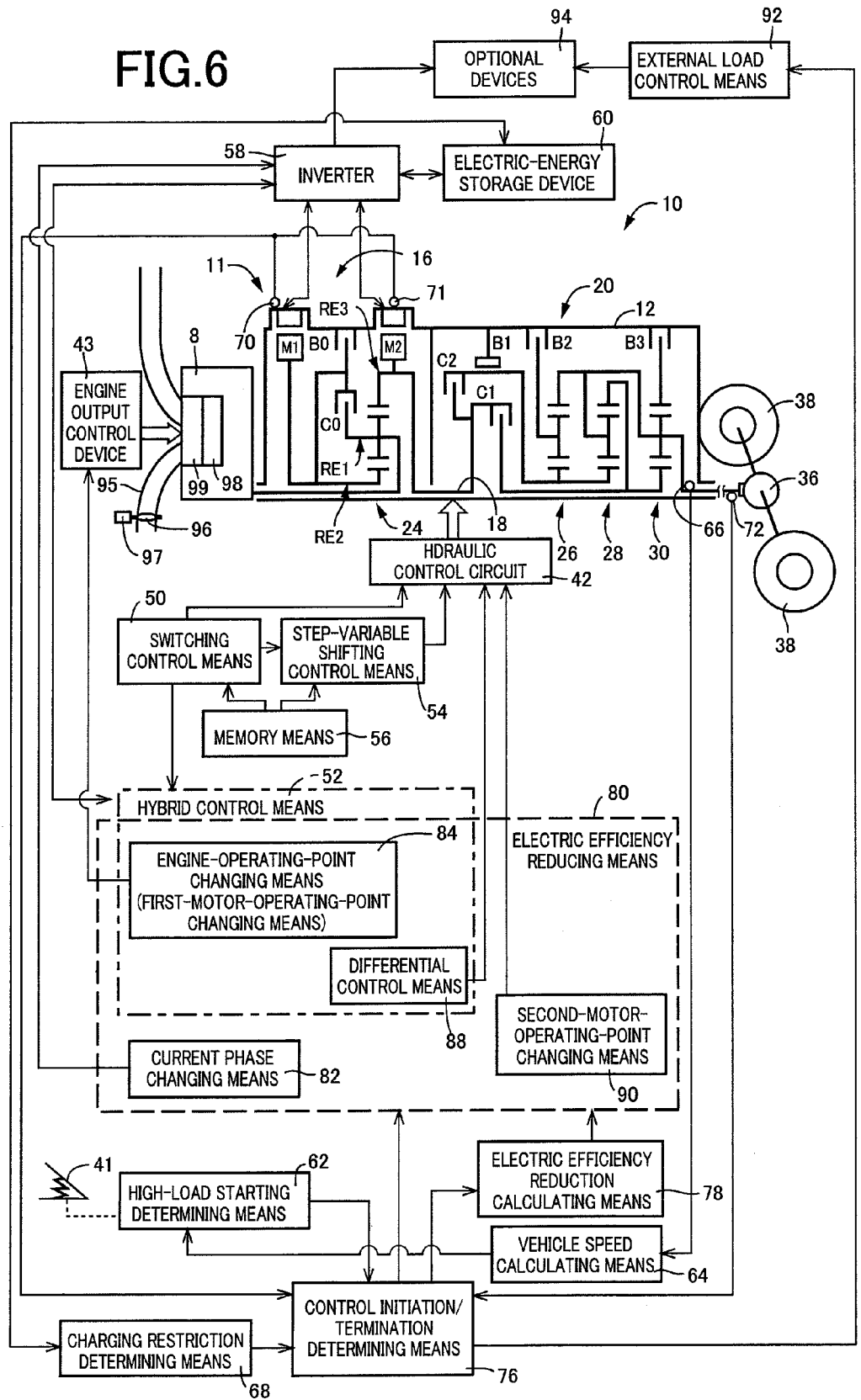
FIG. 6 is a functional block diagram illustrating major control functions of the electronic control device of FIG. 4.

FIG. 6 is a functional block diagram for explaining major control functions of the electronic control device 40. In FIG. 6, step-variable shifting control means 54 functions as shifting control means for controlling shifting actions of the automatic transmission portion 20. For example, the step-variable shifting control means 54 is configured to determine whether a shifting action of the automatic transmission portion 20 should take place, that is, to determine the gear position to which the automatic transmission portion 20 should be shifted. This determination is made on the basis of a condition of the vehicle in the form of the vehicle speed V and a required output torque $T_{OUT}$ of the automatic transmission portion 20, and according to a stored relationship (shifting boundary line map or shifting control map) in memory means 56 indicated by solid and one-dot chain lines in FIG. 7. The step-variable shifting control means 54 executes shifting to achieve the gear position. That is, the step-variable shifting control means 54 performs shifting command i.e., output for shifting to the automatic transmission portion 20 to execute the shifting. Practically, the step-variable shifting control means 54 generates shifting commands to be output to the hydraulic control unit 42, to selectively engage and/or release the hydraulically operated frictional coupling devices (except the switching clutch C0 and brake B0), for establishing the determined gear position of the automatic transmission portion 20 according to the table of FIG. 2. It is noted that the required output torque $T_{OUT}$ of the automatic transmission portion 20 (taken along the vertical axis of the shifting boundary line map of FIG. 7) increases with an increase of the operation amount $A_{CC}$ of the accelerator pedal, so that the required output torque $T_{OUT}$ of the map may be replaced by the accelerator pedal operation amount $A_{CC}$.

Referring back to FIG. 6, hybrid control means 52 is configured to control the engine 8 to be operated in an operating range of high efficiency, and to control the speed ratio γ0 of the differential portion 11 operating as the electrically controlled continuously variable transmission so as to optimize a proportion of drive forces generated by the engine 8 and the second electric motor M2, and a reaction force generated by the first electric motor M1 during its operation as the electric generator, while the power transmitting system 10 is placed in the continuously-variable shifting state, that is, while the differential portion 11 is placed in the differential state. For instance, the hybrid control means 52 calculates a target (required) vehicle output at the present running speed V of the vehicle, on the basis of the operation amount $A_{CC}$ of the accelerator pedal used as an operator's required vehicle output, and the vehicle running speed V, and calculate a target total vehicle output required on the basis of the calculated target vehicle output and a required amount of charging of an electric-energy storage device. The hybrid control means 52 calculates a target engine output to obtain the calculated target total vehicle output, while taking account of a power transmission loss, a load acting on various optional devices of the vehicle, an assisting torque generated by the second electric motor M2, etc. The hybrid control means 52 controls the engine speed $N_E$ and torque $T_E$ of the engine 8, so as to obtain the calculated target engine output, and the amount of generation of the electric energy by the first electric motor M1.

Figure 8:
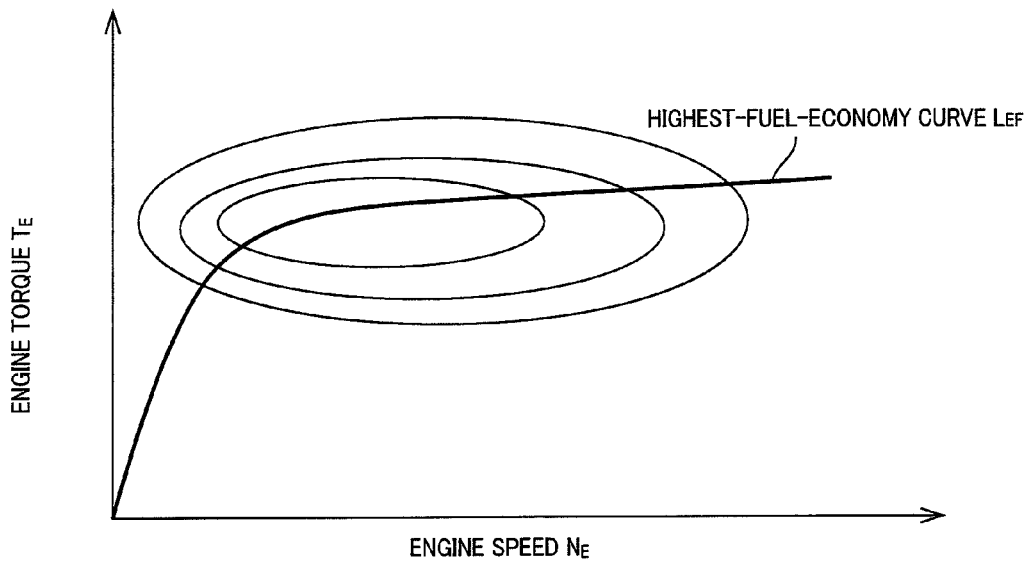
FIG. 8 is a view indicating a highest-fuel-economy curve of the engine of FIG. 1.

The hybrid control means 52 is configured to implement the hybrid control while taking account of the presently selected gear position of the automatic transmission portion 20, so as to improve the drivability of the vehicle and the engine fuel economy. In the hybrid control, the differential portion 11 is controlled to function as the electrically controlled continuously variable transmission, for optimum coordination of the engine speed $N_E$ for efficient operation of the engine 8, and the rotating speed of the power transmitting member 18 determined by the vehicle speed V and the selected gear position of the automatic transmission portion 20. That is, the hybrid control means 52 determines a target value of the overall speed ratio γT of the power transmitting system 10, so that the engine 8 is operated such that an operating point of the engine 8 (hereinafter referred to as "engine operating point") follows a stored highest-fuel-economy curve $L_{EF}$ (fuel-economy map or relation) indicated in FIG. 8 by way of example. The highest-fuel-economy curve is an example of curve representing an operation of the engine 8. The target value of the overall speed ratio γT of the power transmitting system 10 is set to permit the engine speed $N_E$ and output torque $T_E$ to be controlled so that the engine 8 provides an output necessary for obtaining the target vehicle output (target total vehicle output or required vehicle drive force). The highest-fuel-economy curve $L_{EF}$ is obtained by experimentation so as to satisfy both of the desired operating efficiency and the highest fuel economy of the engine 8 during running in continuously variable shifting mode, and is defined in a two-dimensional coordinate system defined by an axis of the engine speed $N_E$ and an axis of the torque of the engine 8 (engine torque $T_E$) as indicated in FIG. 8. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5. The engine operating point is a point which represents the operating state of the engine 8 and which is defined in the two-dimensional coordinate system in which selected two quantities indicative of the operating state of the engine 8 such as the engine speed $N_E$ and engine torque $T_E$ are taken along respective axes.

In the hybrid control, the hybrid control means 52 controls an inverter 58 such that the electric energy generated by the first electric motor M1 is supplied to the electric-energy storage device 60 and the second electric motor M2 through the inverter 58. That is, a major portion of the drive force produced by the engine 8 is mechanically transmitted to the power transmitting member 18, while the remaining portion of the drive force is consumed for power generation by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the devices relating to an operation from the generation of the electric energy to the consumption of the electric energy by the second electric motor M2 constitute an electric path through which the electric energy generated by conversion of a portion of a drive force of the engine 8 is converted into a mechanical energy. The electric-energy storage device 60 is an electric energy source such as a lead acid or other battery, or a capacitor, which is able to supply the first and second electric motors M1, M2 with an electric energy and to be charged with the electric energy supplied from the first electric and second electric motors M1, M2.

The hybrid control means 52 includes engine output control means functioning to control the engine 8, so as to provide a required engine output through the engine output control device 43, by controlling the throttle actuator 97 to open and close the electronic throttle valve 96, controlling an amount and time of fuel injection by the fuel injecting device 98, and/or controlling the timing of ignition of the igniter by the ignition device 99, alone or in combination. For instance, the hybrid control means 52 is basically configured to execute throttle control by controlling the throttle actuator 97 on the basis of the accelerator pedal operation amount $A_{CC}$ and according to a predetermined stored relationship (not shown) between the accelerator pedal operation amount $A_{CC}$ and the throttle valve opening angle $\theta_{TH}$ such that the opening angle $\theta_{TH}$ increases with an increase of the operation amount $A_{CC}$. According to this control of the throttle actuator 97, the throttle valve opening angle $\theta_{TH}$ is controlled in proportion to the accelerator pedal operation amount $A_{CC}$.

Figure 7:
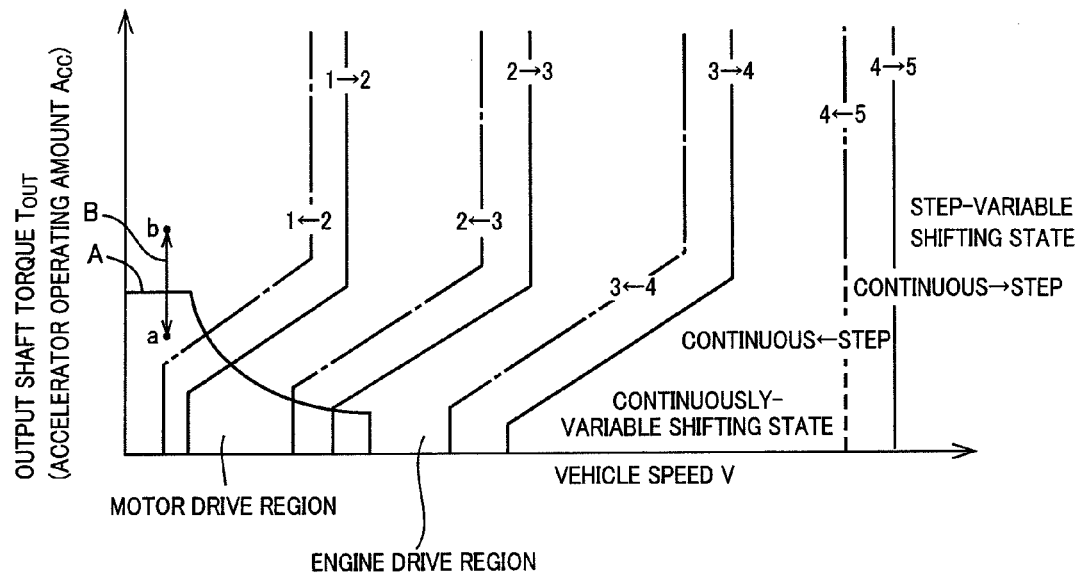
FIG. 7 is a view illustrating an example of a stored shifting boundary line map used for determining a shifting action of an automatic transmission portion, and an example of a stored drive-power-source switching boundary line map defining a boundary line between an engine drive region and a motor drive region for switching between an engine drive mode and a motor drive mode, in the same two-dimensional coordinate system defined by control parameters in the form of a running speed and an required output torque of the vehicle for the power transmitting system of FIG. 1, such that those maps are related to each other.

Solid line A in FIG. 7 represents a boundary line defining an engine-drive region and a motor-drive region, for switching the vehicle drive power source for starting and driving the vehicle (hereinafter referred to as "vehicle driving"), between the engine 8 and the electric motor (e.g., second electric motor M2). In other words, the vehicle drive mode is switchable between an "engine drive mode" corresponding to the engine-drive region for the vehicle driving with the engine 8 used as the vehicle drive power source, and the "motor drive mode" corresponding to the motor-drive region for the vehicle driving with the second electric motor M2 used as the vehicle drive power source. A predetermined stored relationship representing the boundary line (solid line A) of FIG. 7 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory means 56, together with the shifting boundary line map (shifting control map) indicated by the solid lines and one-dot chain lines in FIG. 7.

And, the hybrid control means 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 7. As is understood from FIG. 7, the motor drive mode is generally established by the hybrid control means 52, when the output torque $T_{OUT}$ is in a comparatively low range in which the engine efficiency is low compared with high-torque-region, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control means 52 is configured to hold the engine speed $N_E$ at zero or substantially zero, owing to the electric CVT function (differential function) of the differential portion 11, by controlling the differential portion 11 to perform its differential function, so that the first electric motor speed $N_{M1}$ is controlled so as to be freely rotated, for example, to have a negative speed $N_{M1}$.

The hybrid control means 52 selectively places the engine 8 in the operated state and the non-operated state, that is, to start and stop the engine 8, to selectively establish the engine drive mode and the motor drive mode. The hybrid control means 52 starts and stops the engine 8. The hybrid control means 52 selectively starts or stops the engine 8 when switching between the engine drive mode or the motor drive mode is determined on the basis of the vehicle condition and according to the drive-power-source switching boundary line map illustrated in FIG. 7 by way of example.

When a point representing the vehicle condition is moved from a point "a" in the motor drive region to a point "b" in the engine drive region as a result of an increase of the required output torque $T_{OUT}$ caused by a depressing operation of the accelerator pedal 41, as indicated by solid line B in FIG. 7, for example, the hybrid control means 52 energizes the first electric motor M1 to raise the first electric motor speed $N_{M1}$, that is, to operate the first electric motor M1 as an engine starter, to raise the engine speed $N_E$ to a predetermined value $N_E'$ at which the engine 8 can be started with ignition by the ignition device 99. Thus, the vehicle drive mode is changed from the motor drive mode to the engine drive mode under the control of the hybrid control means 52. The hybrid control means 52 may be configured to rapidly raise the first electric motor speed $N_{M1}$ for rapidly raising the engine speed $N_E$ to the predetermined value $N_E'$. In this case, the vibration of the engine 8 upon starting of the engine 8 can be efficiently avoided or reduced since a resonance region which would appear in a range of the engine speed $N_E$ lower than an idling speed $N_{EIDL}$ as well known in the art is rapidly passed through.

When the point representing the vehicle condition is moved from the point "b" in the engine drive region to the point "a" in the motor drive region as a result of a decrease of the required output torque $T_{OUT}$ caused by a releasing operation of the accelerator pedal 41, as indicated by the solid line B in FIG. 7, the hybrid control means 52 commands the fuel injecting device 98 to stop a fuel supply to the engine 8, namely, to implement a fuel cut of the engine 8, for stopping the engine 8. Thus, the vehicle drive mode is changed from the engine drive mode to the motor drive mode under the control of the hybrid control means 52. The hybrid control means 52 may be configured to rapidly lower the first electric motor speed $N_{M1}$ for rapidly lowering the engine speed $N_E$ to zero or a value close to zero. In this case, the vibration of the engine 8 upon stopping of the engine 8 can be efficiently avoided or reduced since the resonance region is rapidly passed through. Alternatively, the hybrid control means 52 is configured to lower the first electric motor speed $N_{M1}$ for lowering the engine speed $N_E$ before implementing the fuel cut of the engine 8, and then implement the fuel cut at the predetermined engine speed $N_E'$ for stopping the engine 8.

The hybrid control means 52 is further capable of performing a so-called "drive-force assisting" operation to assist the engine 8, by supplying an electric energy to the second electric motor M2 from the first electric motor M1 or from the electric-energy storage device 60 through the electric path described above, to operate the second electric motor M2. In the present embodiment, the drive mode in which the engine 8 and the second electric motor M2 are both used as the drive power source is considered to belong to the engine drive mode rather than the motor drive mode.

The hybrid control means 52 is further configured to hold the engine 8 in an operated state owing to the electric CVT function of the differential portion 11, irrespective of whether the vehicle is stationary or running at a relatively low speed. When the first electric motor M1 is required to be operated by the engine 8 to charge the electric-energy storage device 60 while the vehicle is stationary, as a result of reduction of the electric energy amount SOS stored in the storage device 60, for example, the speed $N_E$ of the engine 8 which is operated to operate the first electric motor M1 at a relatively high speed can be kept high enough to permit the operation of the engine 8 by itself, owing to the differential function of the power distributing mechanism 16, even when the operating speed of the second electric motor M2 determined by the vehicle speed V is zero (substantially zero) while the vehicle is stationary.

The hybrid control means 52 is further configured to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control means 52 is configured to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

Switching control means 50 is provided to select one of the above-described continuously-variable shifting state and step-variable shifting state, that is, one of the above-described differential state and locked state, by engaging and releasing the differential-state switching devices (switching clutch C0 and brake B0). For example, the switching control means 50 is configured to place the power transmitting system 10 in the continuously-variable shifting state when the step/continuous mode switch 46 is placed in its continuously-variable position, and places the power transmitting system 10 in the step-variable shifting state when the step/continuous mode switch 46 is placed in its step-variable position. To place the power transmitting system 10 in the continuously-variable shifting state, the switching control means 50 releases the switching brake B0 and the switching clutch C0. To place the power transmitting system 10 in the step-variable shifting state, on the other hand, the switching control means 50 usually engages the switching clutch C0. However, when the point representing the vehicle condition moves into a high-vehicle-speed region (not shown) on the higher side of the vehicle speed V represented by the 3-4 shift-up line for shifting to the fourth speed position in the shifting boundary line map of FIG. 7, for example, the switching control means 50 engages the switching brake B0 rather than the switching clutch C0, to place the power transmitting system 10 in the step-variable shifting state. The fifth speed position "5th" in the table of FIG. 2 corresponds to the speed position established by engaging the switching brake B0 while the automatic transmission portion 20 is placed in the fourth speed position.

To place the power transmitting system 10 in the continuously-variable shifting state, the switching control means 50 outputs a command to enable the hybrid control means 52 to implement the hybrid control. To place the power transmitting system 10 in the step-variable shifting state, on the other hand, the switching control means 50 outputs a command to disable the hybrid control means 52 to implement the hybrid control, namely, to inhibit the hybrid control by the hybrid control means 52.

The maps of FIG. 7 will be described in detail. The relation (shifting boundary line map or shifting control map) shown in FIG. 7 by way of example is stored in the memory means 56 and used for determining whether the automatic transmission portion 20 should be shifted. The shifting boundary lines are defined in a two-dimensional coordinate system with control parameters consisting of the vehicle speed V and a drive-force-related value in the form of the required output torque $T_{OUT}$. In FIG. 7, the solid lines indicate the shifting lines for determination of shift-up actions (shift-up boundary lines), while the one-dot chain lines indicate the shifting lines for determination of shift-down actions (shift-down boundary lines). For instance, each of the shifting lines in the shifting boundary line map in FIG. 7 consists of a stored series of shifting values (shifting points) for determining whether a point indicating the actual vehicle speed V has moved across the shifting line, at a point of intersection between the shifting line and a horizontal line indicating the required output torque $T_{OUT}$ of the automatic transmission portion 20, or whether a point indicating the required output torque $T_{OUT}$ of the automatic transmission portion 20 has moved across the shifting line, at a point of intersection between the shifting line and a vertical line indicating the vehicle speed V, that is, for determining whether the point move passes the shifting value (shifting point) on the shifting line to execute shifting.

The switching control means 50 may be configured to place the power transmitting system 10 in the step-variable shifting state even when the step/continuous mode switch 46 is placed in the continuously-variable shifting position for maintaining the driving performance of the vehicle, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those components, which components are associated with the electric path through which the electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value of the vehicle, as well as a drive torque or drive force of the drive wheels 38. The parameter may be: an actual value of the engine torque $T_E$ calculated on the basis of the accelerator pedal operation amount or the throttle valve opening angle $\theta_{TH}$ (or intake air quantity, air/fuel ratio or amount of fuel injection) and the engine speed $N_E$; or any one of estimated values of the required (target) engine torque $T_E$, required (target) output torque $T_{OUT}$ of the automatic transmission potion 20 and required vehicle drive force, which are calculated on the basis of the accelerator pedal operation amount or the throttle valve operating angle or the like. The above-described vehicle drive torque may be calculated on the basis of not only the output torque $T_{OUT}$, etc., but also the ratio of the differential gear device and the radius of the drive wheels 38.

As described above, the differential portion 11 (power transmitting system 10) in the present embodiment is selectively switchable between its continuously-variable shifting state and its step-variable shifting state (fixed-speed-ratio shifting state), under the control of the switching control means 50 on the basis of the vehicle condition. Further, the power transmitting system 10 is switchable between the motor drive mode and the engine drive mode, under the control of the hybrid control means 52 on the basis of the vehicle condition. For switching the power transmitting system 10 between the motor and engine drive modes, the engine 8 is started and stopped.

It is noted that a chargeable and dischargeable secondary battery is used as the electric-energy storage device 60, which is provided to store the electric energies generated by the first and second electric motors M1, M2 and to supply the electric energy to the first and second electric motors M1, M2, as described above. For ensuring the durability of the electric-energy storage device 60, a permissible range of the amount of electric energy SOC is predetermined to prevent excessive charging and discharging of the electric-energy storage device 60. The predetermined permissible range is stored in the electronic control device 40 on the basis of the specifications of the electric-energy storage device 60, for example. The thus predetermined permissible range of the amount of electric-energy SOC limits the amount of electric energy that can be further stored in the electric-energy storage device 60 under some situation. The amount of electric energy that can be further stored in the electric-energy storage device 60 (hereinafter referred to as "chargeable electric power") Win is defined as a difference between an upper limit value SOCmax of the electric energy amount SOC and a present value SOCcurrent of the electric energy amount SOC, that is, Win=SOCmax−SOCcurrent.

In the present embodiment, the electric energy generated by the first electric motor M1, for instance, is consumed by operating the second electric motor M2 or by charging the electric-energy storage device 60. Where the chargeable electric power Win is limited, a total amount of the electric energy consumed by the power transmitting system 10 is reduced. If the amount of electric energy to be generated by the first electric motor M1 is reduced in this case, the reaction force to be generated by the first electric motor M1 may be reduced.

In view of the above-indicated situation, the electronic control device 40 provided as the control apparatus for the vehicular power transmitting system 10 of the present invention includes electric efficiency reducing means 80 described below, which is configured for increasing the amount of consumption of the electric energy by the power transmitting system 10, by reducing the electric efficiency of at least one of the first electric motor M1 serving as an electricity generating system, and the second electric motor M2 serving as an electricity charging system. This aspect of the electronic control system 40 will be described.

High-load starting determining means 62 is provided for determining whether the vehicle is in a state of high-load starting. This determination is made on the basis of the operation amount $A_{CC}$ of operation of the accelerator pedal 41 detected by an accelerator angle sensor, and the vehicle speed V calculated by vehicle speed calculating means 64 described below. The state of high-load starting of the vehicle determined by the high-load starting determining means 62 is a state of starting which requires a larger drive force than in a state of starting on a flat roadway. For instance, the state of high-load starting is a state of starting on a steep uphill roadway, or the like, which requires a large engine torque and which takes place at a low vehicle speed. The high-load starting determining means 62 determines that the vehicle is in the state of high-load starting requiring the large engine torque at a vehicle speed higher than a certain value, where the vehicle speed V is lower than a predetermined threshold value V1 (e.g., several km/h) while the accelerator pedal operation amount $A_{CC}$ is larger than a predetermined threshold value Acc1 (e.g., 80%). Where the high-load starting determining means 62 determines that the vehicle is in the state of high-load starting, as described above, the engine 8 generates the vehicle drive force, that is, an engine torque. In this case, the first electric motor M1 connected to the engine 8 through the differential portion 11 is required to generate a reaction force, and therefore generates an electric energy.

The vehicle speed calculating means 64 is configured for calculating the running speed V of the vehicle provided with the vehicular power transmitting system 10. For example, the vehicle speed calculating means 64 calculates the vehicle speed V depending upon the rotating speed $N_{OUT}$ of the output shaft 22 of the vehicular power transmitting system 10 detected by an output shaft speed sensor 66 provided in the vehicle power transmitting system 10, a speed reduction ratio of the final speed reduction gear 36, and the radius of the drive wheels 38.

Charging restriction determining means 68 is provided for determining whether there is a restriction of the chargeable electric power Win of the electric-energy storage device 60. Described in detail, the charging restriction determining means 68 determines that there is the restriction of the chargeable electric power Win of the electric-energy storage device 60, where the chargeable electric power Win represented by the difference between the upper limit value SOCmax of the predetermined permissible range of the electric energy amount SOC of the electric-energy storage device 60 and the present value SOCcurrent of the electric energy amount SOC is smaller than a predetermined threshold value Winth, for example. This threshold value Winth is determined upon determination of the state of high-load starting by the high-load starting determining means 62, for instance, on the basis of a total amount of consumption of the electric energy generated by the first electric motor M1 until the state of high-load starting is terminated, which total amount excludes the amount of electric energy consumed by the second electric motor M2. The charging restriction determining means 68 permits the electric-energy storage device 60 to be charged with a suitable amount of electric energy during a period of time from the moment of initiation of the vehicle starting to the moment of termination of the vehicle starting.

Control initiation/termination determining means 76 is provided for determining the initiation and termination of the control operation of the electricity efficiency reducing means 80. Namely, the electric efficiency reducing means 80 initiates its control operation when the control initiation/termination determining means 76 determines the initiation of the control operation, and terminates its control operation when the control initiation/termination determining means 76 determines the termination of the control operation. Described in detail, the control initiation/termination determining means 76 determines the initiation of the control operation of the electric efficiency reducing means 80, where the high-load starting determining means 62 determines the state of high-load starting of the vehicle while the charging restriction determining means 68 determines that there is the restriction of the chargeable electric power Win of the electric-energy storage device 60, for instance.

The control initiation/termination determining means 76 may be configured for determining the initiation of the control operation of the electric efficiency reducing means 80, where the vehicle load exceeds a predetermined threshold value, as well as where the high-load starting determining means 62 determines the state of high-load starting of the vehicle while the charging restriction determining means 68 determines that there is the restriction of the chargeable electric power Win of the electric-energy storage device 60. This vehicle load is the weight value detected by a vehicle weight sensor 72, for example. The condition that the vehicle load exceeds the predetermined threshold value may be replaced by a combination of this condition and a condition that a towing switch operated by the vehicle operator when the vehicular drive system 10 is required to be driven with a larger drive force to tow another vehicle is in the on state relative to a condition of non-towing. Where the vehicle load exceeds the predetermined threshold value, the engine 8 is required to generate a large drive force for starting the vehicle than when the vehicle load does not exceed the threshold value, and the first electric motor M1 is required to generate the accordingly large reaction force, so that the amount of electric energy generated by the first electric motor M1 is accordingly increased.

The control initiation/termination determining means 76 may be configured for determining the initiation of the control operation of the electric efficiency reducing means 80 where the temperature of the first electric motor M1 detected by a temperature sensor 70 and the temperature of the second electric motor M2 detected by a temperature sensor 71 are lower than an upper limit of a predetermined permissible range of the temperature, as well as where the high-load starting determining means 62 determines the state of high-load starting of the vehicle while the charging restriction determining means 68 determines that there is the restriction of the chargeable electric power Win of the electric-energy storage device 60. The amount of heat generated by the first electric motor M1 or second electric motor M2 increases by the control operation of the electric efficiency reducing means 80, which reduces the electric efficiency of the first electric motor M1 or second electric motor M2. Therefore, the control operation of the electric efficiency reducing means 80 should be inhibited to prevent deterioration of the durability and performance of the first electric motor M1 or second electric motor M2, when the temperature of the first electric motor M1 or second electric motor M2 is higher than the upper limit of the permissible range of the temperature.

The control initiation/termination determining means 76 determines the termination of the control operation of the electric efficiency reducing means 80 where the high-load starting determining means 62 determines that the vehicle is not in the start of high-load starting, or where the charging restriction determining means 68 determines that there is not the restriction of the chargeable electric power Win of the electric-energy storage device 60. As described below, the control operation of the electric efficiency reducing means 80 reduces the electric efficiency and accordingly reduces the fuel economy, so that it is desired to minimize the control operation performed the electric efficiency reducing means 80. Further, the control operation of the electric efficiency reducing means 80 increases the amount of heat generated by the first electric motor M1 or second electric motor M2, so that it is also desired to minimize the control operation of the electric efficiency reducing means 80, from the standpoint of the durability and performance of the first electric motor M1 or second electric motor M2. The high-load starting determining means 62 determines that the vehicle is not in the state of high-load starting, when the vehicle speed V has exceeded a threshold value. Described in detail, the high-load starting determining means 62 determines that the vehicle is not in the state of high-load starting, when the vehicle speed V has been raised to a reduction termination threshold value V2 at which the required vehicle drive force can be obtained without reduction of the electric efficiency by the electric efficiency reducing means 80. This reduction termination threshold value V2 may be calculated from time to time in an on-line manner, on the basis of an electric energy amount PM2 consumed by the second electric motor M2, the required vehicle drive force, the chargeable electric power Win, or any other parameter which changes with the vehicle speed. When the vehicle is not in the state of high-load starting, the operating speed NM2 of the second electric motor M2 rises, and the electric energy amount PM2 consumed by the second electric motor M2 increases, so that the portion of an electric energy amount PM1 generated by the first electric motor M1, which is stored in the electric-energy storage device 60, is reduced. Therefore, the control initiation/termination determining means 76 determines the termination of the control operation of the electric efficiency reducing means 80, when the high-load starting determining means 62 determines that the vehicle is not in the state of high-load starting.

Electric efficiency reduction amount calculating means 78 is provided for calculating an amount of reduction of the electric efficiency by the electric efficiency reducing means 80, when the control initiation/termination determining means 76 determines the initiation of the control operation of the electric efficiency reducing means 80 which will be described. For example, the electric efficiency reduction amount calculating means 78 calculates the electric energy amount PM1 to be generated by the first electric motor M1 so as to generate the required reaction force in the differential portion 11 for the drive force generated by the engine 8, and then calculates the electric energy amount PM2 consumed by the second electric motor M2 an electric energy amount P60 to be stored in the electric-energy storage device 60. Then, the electric efficiency reduction amount calculating means 78 calculates an amount of loss Ploss caused by the reduction of the electric efficiency by the control operation of the electric efficiency reducing means 80, such that a sum of the electric energy amount PM2 consumed by the second electric motor M2, the electric energy amount P60 to be stored in the electric-energy storage device 60, and the amount of loss Ploss is larger than the electric energy amount PM1 generated by the first electric motor M1.

It is noted that the amount of loss Ploss calculated by the electric efficiency reduction amount calculating means 78 increases with an increase of the vehicle load, for the following reasons: That is, the required engine torque increases with the vehicle load, and the reaction torque required to be generated by the first electric motor M1 to transmit the vehicle drive force to the power transmitting member 18 that is the output shaft of the differential portion 11 increases with an increase of the above-indicated required engine torque. The electric energy amount PM1 generated by the first electric motor M1 increases with an increase of the reaction torque generated by the first electric motor M1. Therefore, the electric efficiency reduction amount calculating means 78 calculates the amount of loss Ploss such that the calculated amount of loss Ploss increases with the vehicle load, so that the sum of the electric energy amount PM2 consumed by the second electric motor M2, the electric energy amount P60 to be stored in the electric-energy storage device and the amount of loss Ploss caused by the reduction of the electric efficiency by the control operation of the electric efficiency reducing means 80 is larger than the electric energy amount PM1 generated by the first electric motor M1.

Figure 9:
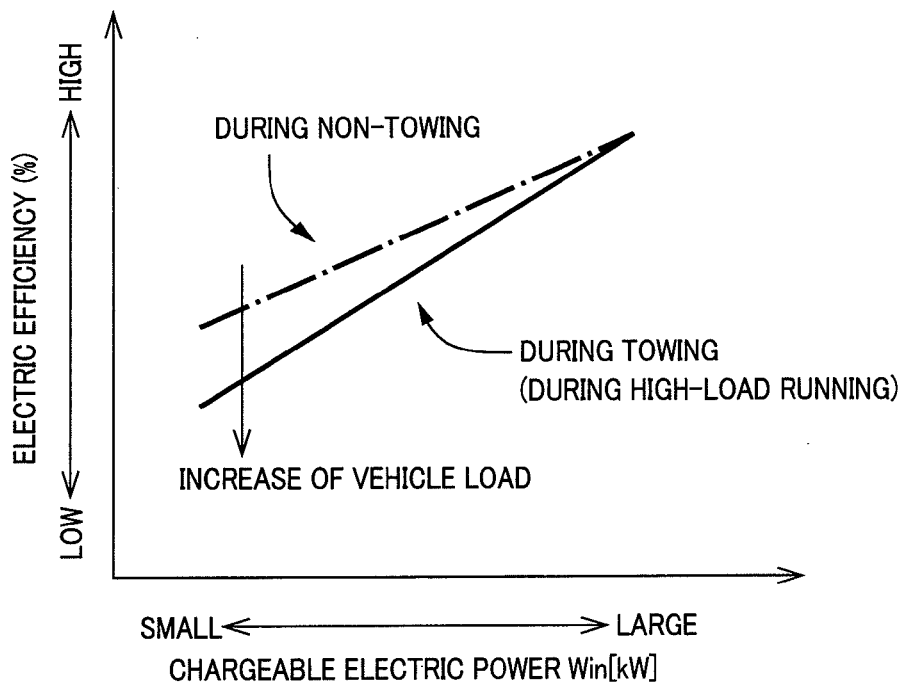
FIG. 9 is a view for explaining a relationship between a state of charge of an electric-energy storage device and electric efficiency to be reduced by electric efficiency reducing means, together with a change of a vehicle load.

FIG. 9 is the view illustrating an example of an operation of the electric efficiency reduction amount calculating means 78, and indicating the reduction of the electric efficiency calculated by the electric efficiency reduction amount calculating means 78, with a change of the chargeable electric power Win, in different vehicle load conditions. In FIG. 9, the chargeable electric power Win is taken along the horizontal axis. The degree of restriction of the chargeable electric power Win increases in the left direction of the horizontal axis. The reduction of the electric efficiency calculated by the electric efficiency reduction amount calculating means 78 is taken along the vertical axis, and the electric efficiency decreases, that is, the amount of loss Ploss increases in the downward direction of the vertical axis. As indicated in FIG. 9, the electric efficiency reduction amount calculating means 78 calculates the amount of reduction of the electric efficiency such that the electric efficiency decreases with a decrease of the chargeable electric power Win and with an increase of the vehicle load.

Referring back to FIG. 6, the electric efficiency reducing means 80 is configured for reducing the electric efficiency in the vehicular power transmitting system 10 when the control initiation/termination determining means 76 determines the initiation of the control operation of the electric efficiency reducing means 80. The electric efficiency reducing means 80 reduces the electric efficiency by the amount as calculated by the electric efficiency reduction amount calculating means 78.

The electric efficiency reducing means 80 functionally includes current phase changing means 82, engine-operating-point changing means 84, differential control means 88 and second-motor-operating-point changing means 90. The engine-operating-point changing means 84 and differential control portion 88 are functional elements of the hybrid control means 52, too. The electric efficiency reducing means 80 is configured to reduce the electric efficiency such that a sum of the amounts of reduction of the electric efficiency by the current phase changing means 82, engine-operating-point changing means 84, differential control means 88 and second-motor-operating-point changing means 90 is equal to the amount of reduction of the electric efficiency calculated by the electric efficiency reduction amount calculating means 78.

The current phase changing means 82 reduces the electric efficiency of the second electric motor M2 by changing the method of the drive current to be applied to the second electric motor M2. Described in detail, the current phase changing means 82 controls the motor drive circuit such as the inverter 58 to change the phase of the drive current to be applied to the second electric motor M2, so that the electric efficiency of the second electric motor M2 decreases as a result of an increase of an amount of the electric current required to be applied to the second electric motor M2 for providing a given output increases.

Figure 10:
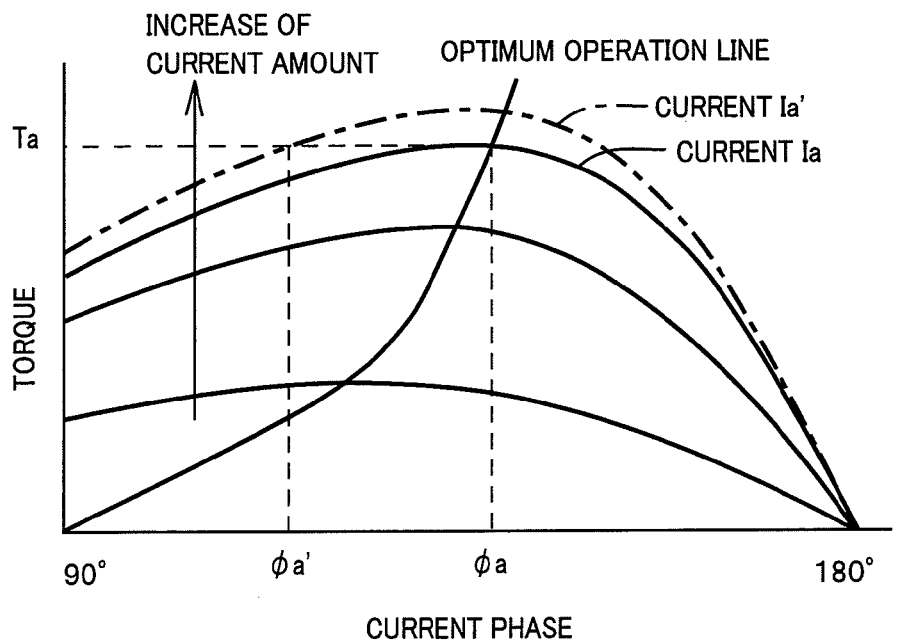
FIG. 10 is a view indicating a relationship between a phase of a drive current of an electric motor and a torque generated by the electric motor, for different amounts of the drive current.

FIG. 10 is the view indicating a relationship between the phase of the drive current and the output torque of a common electric motor such as the second electric motor M2, for different and constant amplitudes of the drive current. An optimum operation line of the electric motor indicated in FIG. 10 is a line connecting points of maximum torque values on respective lines of the different current amplitudes. When the electric motor is operated along this optimum operation line, the required amount of the drive current is minimized, and the electric motor can generate the output torque with the highest electric efficiency. The current phase changing means 82 changes the phase of the drive current of the second electric motor M2, so as to reduce its electric efficiency according to the relationship indicated in FIG. 10 by way of example, namely, such that the operating condition of the second electric motor M2 deviates from the above-described optimum operation line. Where the second electric motor M2 is operated with a current amplitude Ia and a phase ϕa to generate a torque value Ta, as indicated in FIG. 10, for instance, the current phase changing means 82 changes the phase of the drive current to a phase ϕa'. For maintaining the torque value at Ta, the current amplitude is changed to Ia' indicated by one-dot chain line, according to the relationship of FIG. 10. Since Ia'>Ia as is apparent from FIG. 10, the required amount of electric current to generate the same output torque Ta is increased, so that the electric efficiency of the second electric motor M2 can be reduced.

Figure 11:
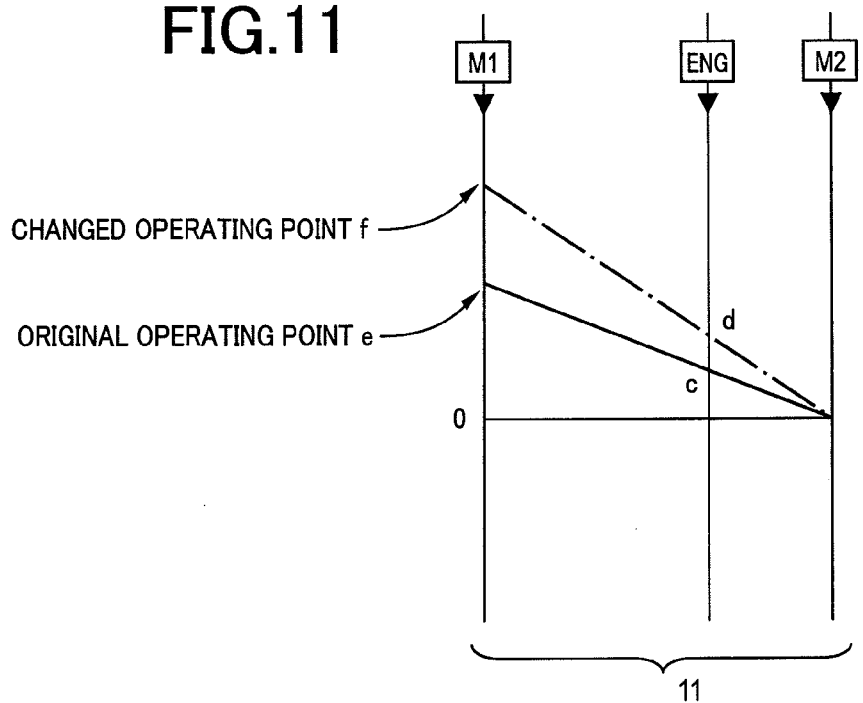
FIG. 11 is a collinear chart for explaining a control to change an operating point of a first electric motor by changing an operating point of the engine, when the vehicular power transmitting system of FIG. 1 is placed in a continuously-variable shifting state.

Referring back to FIG. 6, the engine-operating-point changing means 84 is configured for changing the operating point of the engine 8, and the operating point of the first electric motor M1 connected to the engine 8 through the differential portion 11. Described in detail the engine-operating-point changing means 84 commands the throttle actuator 97 to increase the throttle valve opening angle $\theta_{TH}$, to raise the engine operating speed, for example. FIG. 11 is an example of a collinear chart indicating relative relation of rotating speeds of the rotary elements of the differential portion 11 with a linear line when the engine operating point is changed by the engine-operating-point changing means 84. A solid line in FIG. 11 indicates the relative rotating speeds of the rotary elements before the engine operating point is changed by the engine-operating-point changing means 84, while a one-dot chain line in the same figure indicates the relative rotating speeds after the engine operating point is changed. The relative rotating speeds in this specific example are those upon starting of the vehicle, that is, when the vehicle speed is zero or almost zero with the rotating speed $N_{18}$ of the power transmitting member 18 being zero or almost zero.

In the example of FIG. 11, the operating point of the engine is changed by the engine-operating-point changing means 84 from a point "c" to a point "d", and the operating point of the first electric motor M1 is changed from a point "e" to a point "f" as a result of the change of the operating point of the engine 8 by the engine-operating-point changing means 84.

Figure 12:
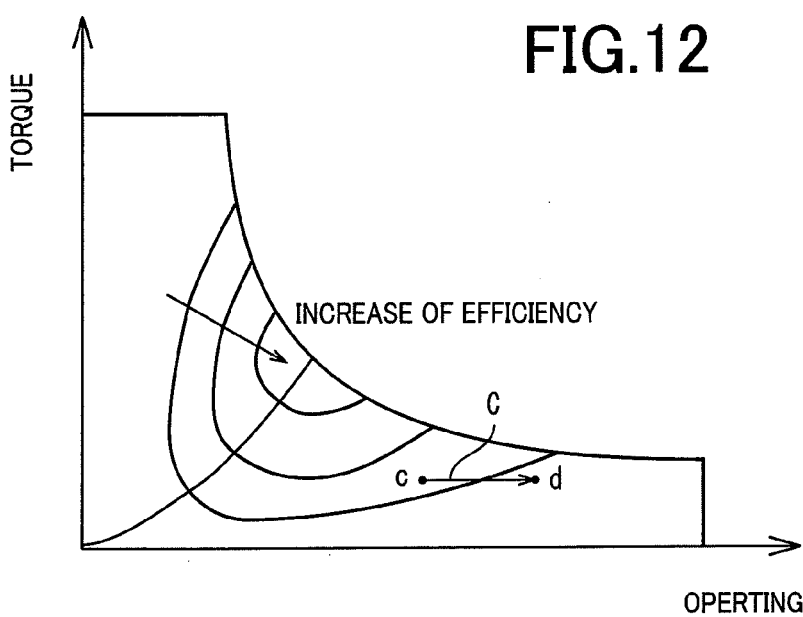
FIG. 12 is an efficiency map for explaining a relationship between an operating state of the electric motor as represented by its operating speed and output torque, and the efficiency corresponding to each operating state.

FIG. 12 is an efficiency map of the first electric motor M1, including efficiency curves in the form of a plurality of contour lines indicated by solid lines, in a two-dimensional coordinate system having an axis of the rotating speed and an axis of the output torque. Points on each efficiency curve have the same efficiency value, and the efficiency values indicated by the relatively inner efficiency curves in the form of the contour lines are higher than those indicated by the relatively outer efficiency curves. Points "c" and "d" in FIG. 12 respectively correspond to the operating points "e" and "f" of the first electric motor M1 in FIG. 11 before and after the operating point of the engine 8 is changed by the engine-operating-point changing means 84. The operating point of the electric motor is a point which indicates the operating state of the electric motor and which is defined in the two-dimensional coordinate system as shown in FIG. 12 by way of example, which have axes of operating quantities of the electric motor such as the operating speed and output.

The operating point of the first electric motor M1 is changed so as to increase a portion of the torque generated by the engine 8, which portion is directly transmitted to the power transmitting member 18 that is the output shaft of the differential portion 11. For example, the operating point of the first electric motor M1 is changed from the point "c" to the point "d" to prevent a change of the reaction torque of the first electric motor M1, as indicated in FIG. 12, so that an increase of the engine torque contributes to an increase of the directly transmitted portion of the engine torque.

Since the operating point of the first electric motor M1 is changed so as to reduce its electric efficiency as indicated in FIG. 12, the rotating speed of the input shaft speed of the first electric motor M1 to generate a given amount of electric energy is increased as a result of the change of the operating point. Thus, the engine-operating-point changing means 84 also functions as means for changing the operating point of the first electric motor M1.

The differential control means 88 is configured for implementing a slipping control of at least one of the switching clutch C0 and switching brake B0 which serve as a differential limiting device in the differential portion 11. In this slipping control, at least one of the switching clutch C0 and switching brake B0 is controlled to have a slipping action. Described in detail, the differential control means 88 commands the hydraulic control unit 42 to control the engaging hydraulic pressure of at least one of the switching clutch C0 and switching brake B0, so that the switching clutch C0 and/or the switching brake B0 is/are brought into the slipping state, into a state other than the fully engaged state and the fully released state. The slipping action of at least one of the switching clutch C0 and switching brake B0 caused by the differential control means 88 results in energy consumption due to friction, and a consequent change of the operating point of the first electric motor M1. Namely, the reaction torque in the differential portion 11 corresponding to the drive force of the engine 8 is counterbalanced by not only the first electric motor M1, but also the frictional energy of at least one of the switching clutch C0 and switching brake B0 which is placed in the slipping state, so that the reaction force required to be generated by the first electric motor M1 can be reduced, whereby the electric energy to be generated by the first electric motor M1 can be reduced.

The second-motor-operating-point changing means 90 is configured for changing the operating point of the second electric motor M2 by controlling at least one of the presently engaged frictional coupling elements provided in the power transmitting path in the automatic transmission portion 20 from the second electric motor M2 to the output shaft 22, such that the above-indicated at least one frictional coupling element placed in the engaged state is brought into the slipping state. Described in detail, the second-motor-operating-point changing means 90 controls at least one of those of the frictional coupling elements of the automatic transmission portion 20 (consisting of the first clutch C1, second clutch C2, first brake B1, second brake B2 and third brake B3), which are presently placed in the engaged state to establish the presently selected speed position of the automatic transmission portion 20 at which the second-motor-operating-point changing means 90 changes the operating point of the second electric motor M2, such that the above-indicated at least one of the presently engaged frictional coupling devices is brought into the slipping state. Where the automatic transmission portion 20 is placed in the first speed position, as shown in FIG. 2, the hydraulic control unit 42 is commanded so that at least one of the first clutch C1 and third brake B3 which are presently placed in the engaged state, for instance, the first clutch C1 is brought into the slipping state. As a result of the slipping action of at least one of the presently engaged frictional coupling elements under the control of the second-motor-operating-point changing means 90, the power transmission through the above-indicated at least one presently engaged frictional coupling element is stopped, so that the second element motor M2 is required to generate a frictional energy corresponding to the amount of slipping of the slipping frictional coupling device, for transmitting to the output shaft 20 the same output torque as that before the slipping action. Thus, the operating point of the second electric motor M2 is changed.

External load control means 92 is provided for actuating the optional devices 94 provided as electric loads in the vehicle, such as a defogger device. The actuation of the optional devices 94 results in consumption of the electric energy stored in the electric-energy storage device 60, so that the electric energy amount SOC stored in the electric-energy storage device 60 is reduced to reduce the required amount of restriction of the chargeable electric power Win.

The electric efficiency reducing means 80 reduces the electric efficiency by operating one of the current phase changing means 82, engine-operating-point changing means 84, differential control means 88 and second-motor-operating-point changing means 90, or a plurality of those means 82-90. The electric efficiency reducing means 80 may have a predetermined order of priority of operation of the above-indicated plurality of means, according to which the different means are operated to reduce the electric efficiency. Described in detail, the current phase changing means 82, engine-operating-point changing means 84 and second-motor-operating-point changing means 90 are operated with higher priority, for example. In this case, the differential control portion 88 is additionally operated if the reduction of the electric efficiency by the higher-priority means 82, 84, 90 is not sufficient, and the external load control means 92 is further additionally operated if the reduction of the electric efficiency is still insufficient. Alternatively, a selected one of different combinations of the above-indicated plurality of means may be operated. The above-described order of priority is determined such that the plurality of means are operated in the order of their effects of reduction of the electric efficiency, for instance.

Figure 13:
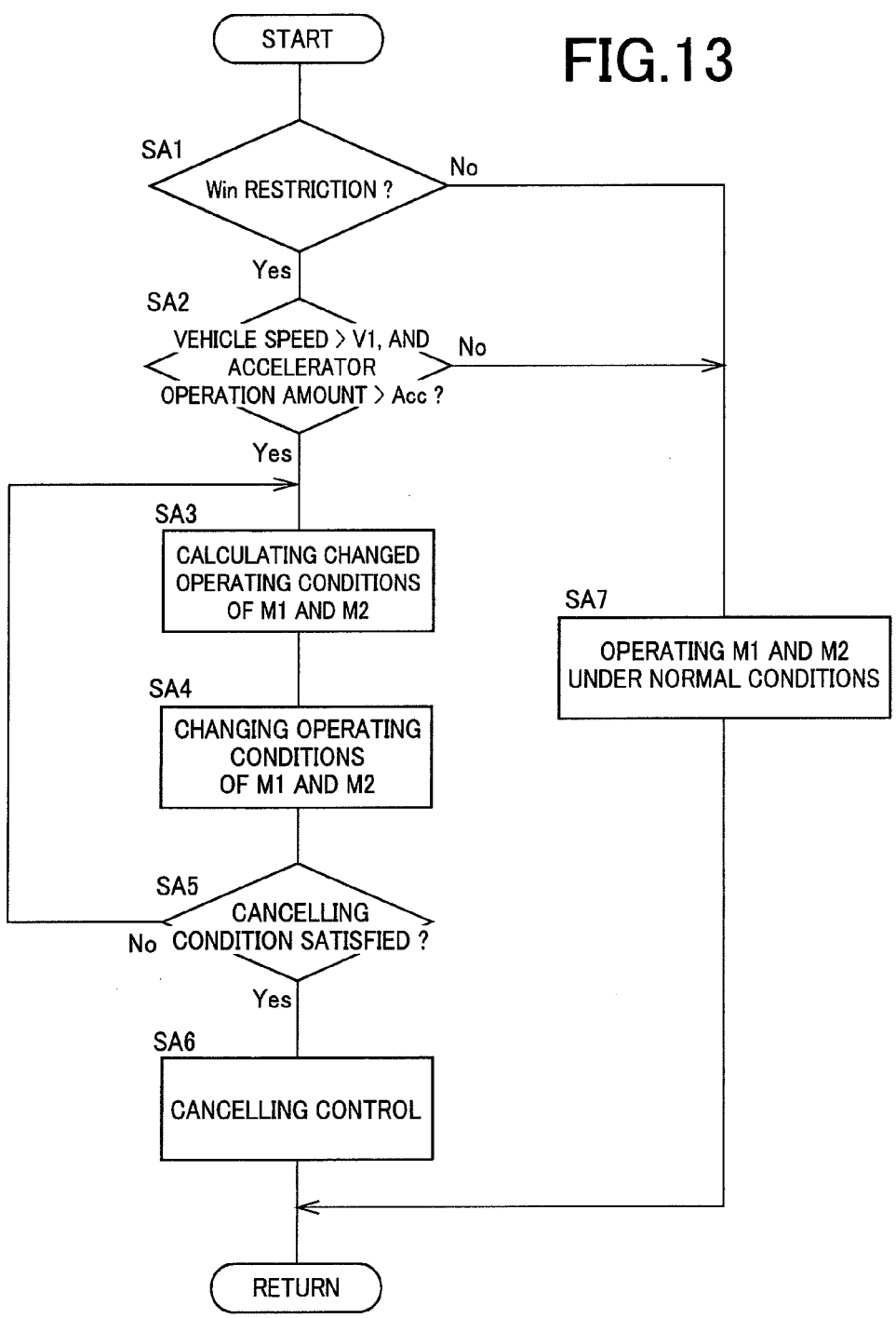
FIG. 13 is a flow chart illustrating a major function of the electronic control device of FIG. 4, that is, a control operation to reduce the electric efficiency.

FIG. 13 is the flow chart illustrating a major function of the electronic control device 40, that is, a control operation to reduce the electric efficiency in the vehicular power transmitting system 10. This control operation is repeatedly performed with an extremely short cycle time of about several milliseconds to about several tens of milliseconds, for example.

Step SA1 ("step" being hereinafter omitted) corresponds to the charging restriction determining means 68 and the control initiation/termination determining means 76. This SA1 is implemented to determine whether the chargeable electric power Win calculated on the basis of the electric energy amount SOCcurrent presently stored in the electric-energy storage device 60 and the upper limit SOCmax of the predetermined permissible range of the electric energy amount SOC is smaller than the predetermined threshold value Winth. When the chargeable electric power Win is smaller than the threshold value Winth, an affirmative determination that the charging of the electric-energy storage device 60 is restricted is obtained in the SA1. When the chargeable electric power Win is equal to or larger than the predetermined threshold value Winth, on the other hand, a negative determination that the charging of the electric-energy storage device 60 is not restricted is obtained in the SA1 and SA7 is executed.

The following SA2 corresponds to the high-load starting determining means 62 and the control initiation/termination determining means 76. The SA2 is implemented to determine whether the vehicle is in the state of high-load starting. The state of high-load starting of the vehicle which requires a relatively large vehicle drive force is determined if the vehicle speed V is lower than the predetermined threshold value V1, for instance, several km/h, and if the accelerator pedal operation amount $A_{CC}$ is larger than the predetermined threshold value $A_{CC1}$, for instance, 80%. When the vehicle is in the state of high-load starting, an affirmative determination is obtained in the SA2 and SA3 is executed. When the vehicle is not in the state of high-load starting, on the other hand, a negative determination is obtained in the SA2 and SA7 is executed.

SA3 corresponding to the electric efficiency reduction amount calculating means 78 is implemented to perform arithmetic operations for changing the operating conditions of the first electric motor M1 and the second electric motor M2. Described in detail, for determining the amount of reduction of the electric efficiency by the electric efficiency reducing means 80, the amount of loss Ploss caused by the reduction is calculated such that a sum of the electric energy amount PM2 consumed by the second electric motor M2, the electric energy amount P60 to be stored in the electric-energy storage device 60, and the amount of loss Ploss is larger than the electric energy amount PM1 generated by the first electric motor M1. The amount of loss Ploss is calculated by the electric efficiency reduction amount calculating means 78 such that the calculated amount of loss Ploss increases with an increase of the vehicle load such as the weight of another vehicle to be towed by the vehicle, and the total vehicle weight including a cargo.

SA4 corresponding to the electric efficiency reducing means 80 is implemented to reduce the electric efficiency such that the amount of loss Ploss calculated in the SA3 takes place. Described in detail, the electric efficiency of at least one of the first electric motor M1 and second electric motor M2 is reduced by changing the phase of the drive current to be applied to the above-indicated at least one of the first and second electric motors M1, M2. If necessary, the operating point of the engine 8 is additionally changed to change the operating point of the first electric motor M1 connected to the engine 8 through the differential portion 11, for operating the first electric motor M1 with a lower degree of its electric efficiency than before. Alternatively, the frictional coupling devices placed in the engaged state, that is, the power transmissive state between the second electric motor M2 and the output shaft 22 are brought into the slipping state, to change the operating state of the second electric motor M2, for operating the second electric motor M2 with a lower degree of its electric efficiency than before.

If the amount of loss caused by the reduction of the electric efficiency by changing the phase of the drive current of at least one of the first and second electric motors M1, M2, the operating point of the first electric motor M1 and the operating point of the second electric motor M2 is not sufficient to cause the amount of loss Ploss calculated in the SA3, at least one of the switching clutch C0 and switching brake B0 provided to control the operating state of the differential portion 11 is also brought into the slipping state, as previously described, so that the reaction torque corresponding to the torque generated by the engine 8 is partially counterbalanced by the frictional energy of the at least one of the switching clutch C0 and switching brake B0 which is placed in the slipping state, so that the electric energy to be generated by the first electric motor M1 can be reduced.

Alternatively, the external load control means 92 actuates the optional devices 94. for consumption of the electric energy if the amount of loss caused by the reduction of the electric efficiency by changing the phase of the drive current of at least one of the first and second electric motors M1, M2, the operating point of the first electric motor M1 and the operating point of the second electric motor M2 is not sufficient to cause the amount of loss Ploss calculated in the SA3.

SA5 corresponding to the control initiation/termination determining means 76 is implemented to determine whether a condition to cancel the reduction of the electric efficiency is satisfied or not. For example, this determination is made by determining whether the vehicle speed has been raised to the reduction termination threshold value V2 at which the required vehicle drive force can be obtained without reduction of the electric efficiency by the electric efficiency reducing means 80. This reduction termination threshold value V2 of the vehicle speed is calculated from time to time in the on-line manner, on the basis of the electric energy amount PM2 consumed by the second electric motor M2, the required vehicle drive force, the chargeable electric power Win, or any other parameter which changes with the vehicle speed. In this respect, it is noted that the required vehicle drive force varies with the vehicle running condition such as the vehicle load and the gradient of the roadway, and that the chargeable electric power Win also varies accordingly.

SA6 is implemented to perform a canceling control wherein the operating points of the first and second electric motors M1, M2 or operating point of the engine 8 moved in the SA4 is/are moved to the points or point prior to the reduction of the electric efficiency. Described in detail, the canceling control is performed, for example, to calculate the operating points of the first and second electric motors M1, M2 and engine 8 for providing the required vehicle drive force without reduction of the electric efficiency, and to change the actual operating points to the calculated operating points, within a predetermined period of time. For example, the operating points without reduction of the electric efficiency are operating points corresponding to operating state in which the operating efficiencies are highest. For instance, the operating efficiencies of the first and second electric motors M1, M2 are highest at the operating points lying on a highest efficiency line L1 in the efficiency map indicated in FIG. 9, and the operating efficiency of the engine 8 is highest at the operating point lying on the highest fuel-economy curve $L_{EF}$ shown in FIG. 8.

If the negative determination is obtained in the SA1 or SA2, namely, if there is not the restriction of the chargeable electric power Win, or if the vehicle is not in the state of high-load starting, SA7 is implemented to control the engine 8, and the first and second electric motors M1, M2, so as to establish the predetermined operating points without reduction of the electric efficiency. Described in detail, the operating points are controlled to maximize the operating efficiencies, for providing the required vehicle drive force, as described above, for example.

Figure 14:
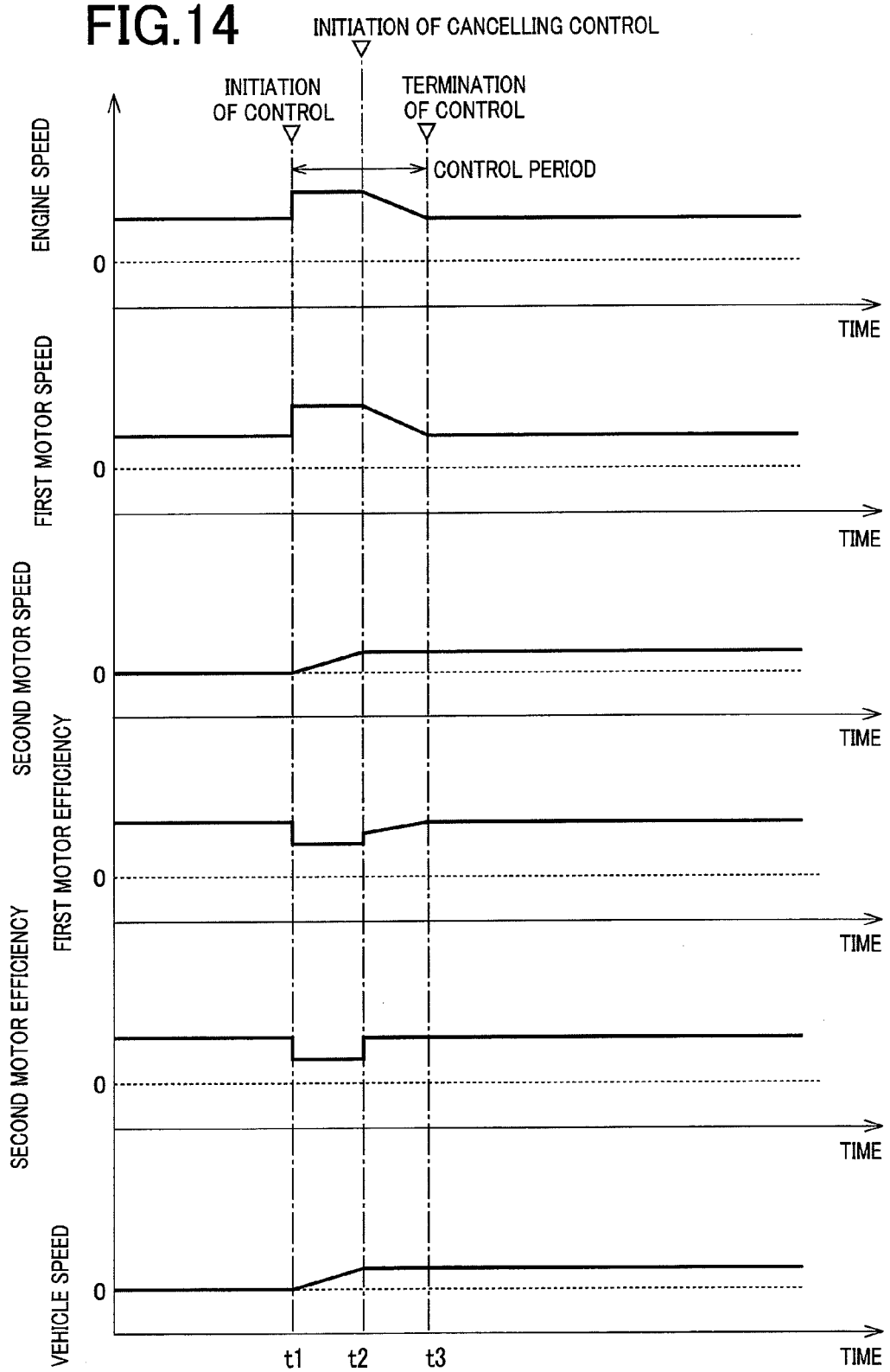
FIG. 14 is a time chart indicating the control operation to reduce the electric efficiency upon starting of the vehicle when the power transmitting system of FIG. 1 is placed in the continuously-variable shifting state.

FIG. 14 is the time chart for explaining an example of the control operation of the control apparatus of the vehicular power transmitting system of the present invention, to reduce the electric efficiency. The time chart indicates changes of the engine speed NE, operating speed NM1 of the first electric motor M1, operating speed NM2 of the second electric motor M2, electric efficiency of the first electric motor M1, electric efficiency of the second electric motor M2, and vehicle speed V.

As indicated in FIG. 14, the vehicle speed V is kept zero, that is, the vehicle is held standstill or stationary, up to a point of time t1 at which the operation to start the vehicle is performed by the vehicle operator. At the point of time t1, the accelerator pedal operation amount $A_{CC}$ is larger than the predetermined threshold value $A_{CC1}$, so that the high-load starting determining means 62 determines that the vehicle is in the state of high-load starting. When the charging restriction determining means 68 determines that the chargeable electric power Win in the electric-energy storage device 60 is smaller than the predetermined threshold value Winth, the control initiation/termination determining means 76 determines the initiation of the control operation to reduce the electric efficiency (that is, the affirmative determinations are obtained in the SA1 and SA2).

Accordingly, the electric efficiency reducing means 80 initiates its control operation to reduce the electric efficiency. Described in detail, the engine operating-point changing means 84 changes the operating point of the engine 8 for the present accelerator pedal operation amount $A_{CC}$, with respect to the normal operating point without reduction of the electric efficiency, for reducing the electric efficiency of the first electric motor M1 connected to the engine 8 through the differential portion 11. For example, the operating point of the engine 8 is changed from the point "c" in FIG. 11 prior to the control operation to reduce the electric efficiency, to the point "d" in the same figure. Accordingly, the engine speed NE is raised, at the point of time t1, to a level corresponding to the changed operating point.

The operating speed NM1 of the first electric motor M1 is raised, at the point of time t1, by the operation of the engine 8 through the differential portion 11. Accordingly, a rise of the operating speed NM1 of the first electric motor M1 at the point of time t1 is determined by the engine speed NE and the speed ratio of the differential portion 11. The first electric motor M1 generates an electric energy as a result of the rise of its operating speed, and the differential portion 11 generates a reaction torque counterbalancing the engine torque. The amount of electric energy generated by the first electric motor M1 at a given value of its operating speed is reduced relative to the amount before the reduction of the electric efficiency due to the reduction of the electric efficiency by the current phase changing means 82. Where at least one of the switching clutch C0 and switching brake B0 is brought into the slipping state by the differential control means 88, the above-indicated engine torque is counterbalanced by a sum of the at least one of the switching clutch C0 and switching brake B0 placed in the slipping state, and the reaction torque of the first electric motor M1.

The operating speed NM2 of the second electric motor M2 is determined by the vehicle speed V and the speed ratio of the automatic transmission portion 20. Namely, a portion of the torque generated by the engine 8 at the point t1, which portion is directly transmitted to the power transmitting member 18 through the differential portion 11, and the output torque of the second electric motor M2 are transmitted to the drive wheels 38 to start the vehicle, and raise the vehicle speed V. As the vehicle speed V is raised, the operating speed NM2 of the second electric motor M2 is also raised.

Further, the electric efficiencies of the first electric motor M1 and second electric motor M2 are reduced by the electric efficiency reducing means 80, at the point of time t1, to values lower than before.

At a point of time t2, the vehicle speed V exceeds the reduction termination threshold value V2, so that the control initiation/termination determining means 76 (SA5) determines the termination of the reduction of the electric efficiency by the electric efficiency reducing means 80. As a result, the canceling control to terminate the reduction of the electric efficiency is implemented during a time period from the point of time t2 to a point of time t3. In this canceling control, the operating points of the engine 8 and the first and second electric motors M1, M2 are changed from the points established by the reduction of the electric efficiency, to maximize the operating efficiencies of the engine 8 and first and second electric motors M1, M2, for realizing the vehicle running required by an operation of the accelerator pedal by the vehicle operator, for example. In the example of the time chart of FIG. 14, the vehicle is run at a constant speed, as a result of termination at the point of time t2 of the vehicle operator's operation to accelerate the vehicle. It is noted that although the operating point of the second electric motor M2 is changed at the point of time t2, that is, a short time after the moment of initiation of the canceling control, the operating point can be changed instantly at the moment of initiation of the canceling control, if the instant change of the operating point does not give the vehicle passengers an impact of vibration or any other shock. In this case, the canceling control can be completed within a shorter length of time.

According to the embodiment described above, the electric efficiency reducing means 80 reduces the electric efficiency of at least one of the first electric motor M1 and the second electric motor M2, when an input of an electric energy into the chargeable electric-energy storage device 60 is restricted, during an operation of the engine 8 to provide the vehicle drive force and generation of the electric energy by at least one of the first electric motor M1 and the second electric motor M2, so that the amount of electric energy generated by the first electric motor M1 is reduced, and/or the amount of electric energy consumed by the second electric motor M2 is increased, whereby a sufficient vehicle drive force can be obtained even when the input into the electric-energy storage device 60 is restricted.

The present embodiment is further arranged such that the amount of reduction of the electric efficiency by the electric efficiency reducing means 80 increases with an increase of a load of the vehicle. Since the amount of reduction of the electric efficiency is increased as the vehicle load such as the vehicle weight or a towing load of the vehicle is increased, a sufficient vehicle drive force can be obtained even when a large vehicle drive force is required due to the large vehicle load. Further, it is possible to minimize the degree of reduction of the fuel economy due to the reduction of the electric efficiency.

The present embodiment is further arranged such that the amount of reduction of the electric efficiency by the electric efficiency reducing means 80 increases with a decrease of a permissible amount of input of the electric energy into the electric-energy storage device 60, that is, with a decrease of the chargeable electric power Win, so that a sufficient vehicle drive force can be obtained even when the electric power Win chargeable into the electric-energy storage device 60 is small, and the generated electric energy is difficult to be consumed. Further, it is possible to minimize the degree of reduction of the fuel economy due to the reduction of the electric efficiency.

The present embodiment is also arranged such that the reduction of the electric efficiency is implemented by the electric efficiency reducing means 80 for a period of time from the moment of starting of the vehicle to the moment at which the vehicle speed V has been raised to the predetermined reduction termination threshold value V2, so that a sufficient vehicle drive force can be obtained even when the amount of consumption of the electric energy by the electric motor is small while especially the vehicle speed V is low. Further, since the reduction of the electric efficiency by the electric efficiency reducing means 80 is terminated by the control initiation/termination determining means 76 when the vehicle speed V has been raised to the predetermined threshold value V2, it is possible to reduce the amount of heat generation due to the reduction of the electric efficiency.

The present embodiment is further arranged such that the reduction of the electric efficiency by the electric efficiency reducing means 80 is implemented while the accelerator pedal operation amount $_{ACC}$ is larger than the predetermined threshold value $A_{CC1}$, namely, while the engine is in a predetermined range of its torque. In this case, when the predetermined amount of the drive force is required, the reduction of the electric efficiency is implemented when the engine torque is in the predetermined range, so that the required vehicle drive force can be obtained. Further, it s possible to minimize the degree of reduction of the fuel economy due to the reduction of the electric efficiency.

The present embodiment is also arranged such that the reduction of the electric efficiency by the electric efficiency reducing means 80 is implemented by changing a manner of application of the electric current to at least one of the first electric motor M1 and the second electric motor M2 with the current phase changing means 82. Since the electric efficiency of the above-indicated at least one of the first electric motor M1 and the second electric motor M2 can be reduced by changing the manner of application of the electric current to the at least one of the first electric motor M1 and the second electric motor M2, a sufficient vehicle drive force can be obtained even when the input of the electric energy into the electric-energy storage device 60 is restricted.

The present embodiment is further arranged such that the reduction of the electric efficiency by the electric efficiency reducing means 80 is implemented by at least one of the engine-operating-point changing means 84 and the second-motor-operating-point changing means 90, by changing the operating point of the first electric motor M1, and/or the operating point of the second electric motor M2. Since the electric efficiency of the at least one of the first electric motor M1 and the second electric motor M2 can be reduced by changing the operating point of at least one of the first electric motor M1 and the second electric motor M2, a sufficient vehicle drive force can be obtained even when the input of the electric energy into the electric-energy storage device 60 is restricted.

The present embodiment is further arranged such that the reduction of the electric efficiency by the electric efficiency reducing means 80 is implemented while the temperature of at least one of the first electric motor M1 and the second electric motor M2 is in a predetermined permissible range, so that the reduction of the electric efficiency has an advantage of preventing deterioration of the durability and performance of the first electric motor M1 and the second electric motor M2 due to a rise of their temperatures caused by the reduction of the electric efficiency, in addition to an advantage of obtaining a sufficient vehicle drive force even when the input of the electric energy into the electric-energy storage device 60 is restricted.

The present embodiment is also arranged such that the control initiation/termination determining means 76 commands the electric load 94 provided outside the vehicular power transmitting system 10, to be actuated to consume the electric energy generated by the first electric motor, when a sufficient vehicle drive force cannot be obtained by the reduction of the electric efficiency by the electric efficiency reducing means 80, that is, by the reduction of the electric efficiencies of the first electric motor M1 and the second electric motor M2 by the current phase changing means 82, by the change of the operating point of the first electric motor M1 by the engine-operating-point changing means 84, and by the change of the operating point of the second electric motor M2 by the second-motor-operating-point changing means 90. Therefore, the control initiation/termination determining means 76 has an advantage of obtaining the sufficient vehicle drive force owing to the electric energy consumption by the electric load provided outside the vehicular power transmitting system 10, in addition to an advantage of reducing the amount of electric energy generated by the first electric motor M1 and/or increasing the amount of electric energy consumed by the second electric motor M2, owing to the reduction of the electric efficiency.

The present embodiment is further arranged such that the electrically controlled differential portion 11 is provided with the switching clutch C0 and the switching brake B0 serving as the differential limiting device configured to disable and enable the differential mechanism to perform a differential action, for thereby switching the vehicular power transmitting system 10 between the step-variable shifting state in which the speed ratio is variable in steps, and the continuously-variable shifting state in which the speed ratio is continuously variable. The electronic control device 40 serving as the control apparatus for the vehicular power transmitting system 10 is provided with the differential control means 88 configured to place at least one of the switching clutch C0 and the switching brake B0 in the slipping state, when a sufficient vehicle drive force cannot be obtained by the reduction of the electric efficiency by the electric efficiency reducing means 80, that is, by the reduction of the electric efficiencies of the first electric motor M1 and the second electric motor M2 by the current phase changing means 82, by the change of the operating point of the first electric motor M1 by the engine-operating-point changing means 84, and by the change of the operating point of the second electric motor M2 by the second-motor-operating-point changing means 90. Therefore, the control apparatus has an advantage of obtaining the sufficient vehicle drive force even when the input to the electric-energy storage device 60 is restricted, owing to the electric energy consumption by the slipping action of at least one of the switching clutch C0 and the switching brake B0, in addition to an advantage of reducing the amount of electric energy generated by the first electric motor M1 and/or increasing the amount of electric energy consumed by the second electric motor M2, owing to the reduction of the electric efficiency.

The present embodiment is also arranged such that the electrically controlled differential portion 11 is provided with the switching clutch C0 and the switching brake B0 serving as the differential limiting device configured to disable and enable the differential mechanism to perform a differential action, for thereby switching the vehicular power transmitting system 10 between the step-variable shifting state in which the speed ratio is variable in steps, and the continuously-variable shifting state in which the speed ratio is continuously variable, and such that the transmission portion 20 is constituted by a step-variable transmission constructed to have a selected one of a plurality of speed ratios. When the differential mechanism is enabled by the differential limiting device to perform the differential action, namely, switched to a continuously-variable shifting state, the vehicular power transmitting system is placed in the continuously-variable shifting state wherein the speed ratio, which is a ratio of the rotating speed of the input shaft of the above-indicated electrically controlled differential portion to the rotating speed of the output shaft of the transmission portion, is continuously variable. Accordingly, a hybrid vehicle provided with the above-indicated differential limiting device to switch the power transmitting system between the step-variable shifting state and the continuously-variable shifting state has not only an advantage of reduced shifting shock, but also an advantage of reduced deterioration of fuel economy.

Another embodiment of the present invention will be described next. It is to be understood that the same reference signs will be used to identify the same elements as described with respect to the preceding embodiment.

Embodiment 2

Figures 15, 16:
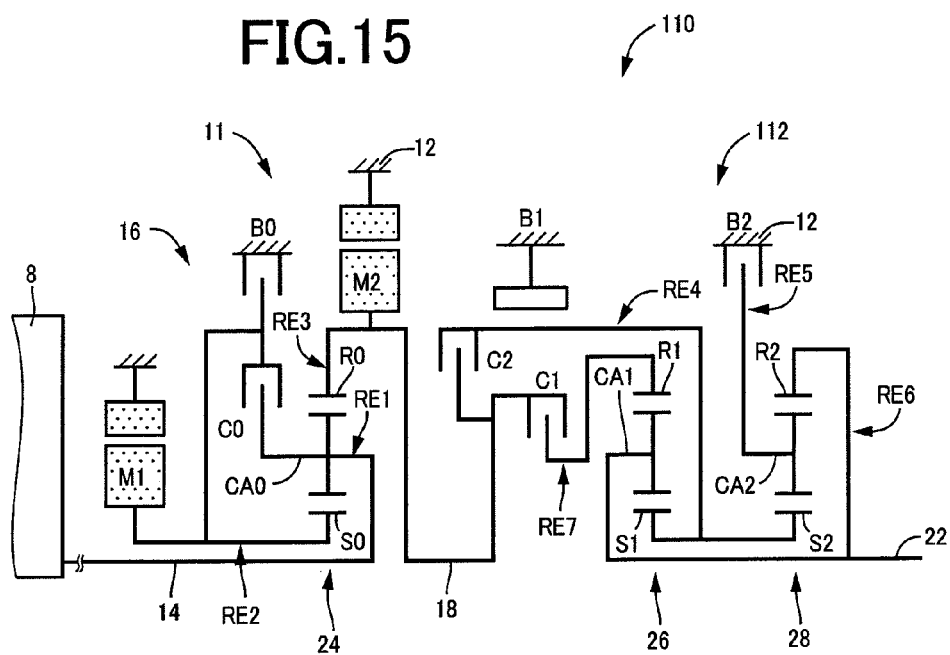
FIG. 15 is a schematic view corresponding to that of FIG. 1, explaining another arrangement of the vehicular power transmitting system according to a second embodiment of the invention.
FIG. 16 is a table corresponding to that of FIG. 2, indicating shifting actions of the vehicular power transmitting system of FIG. 13 according to the second embodiment, in step-variable shifting state, in relation to different combinations of operating states of hydraulically operated frictional coupling devices to effect the respective shifting actions.
Figure 17:
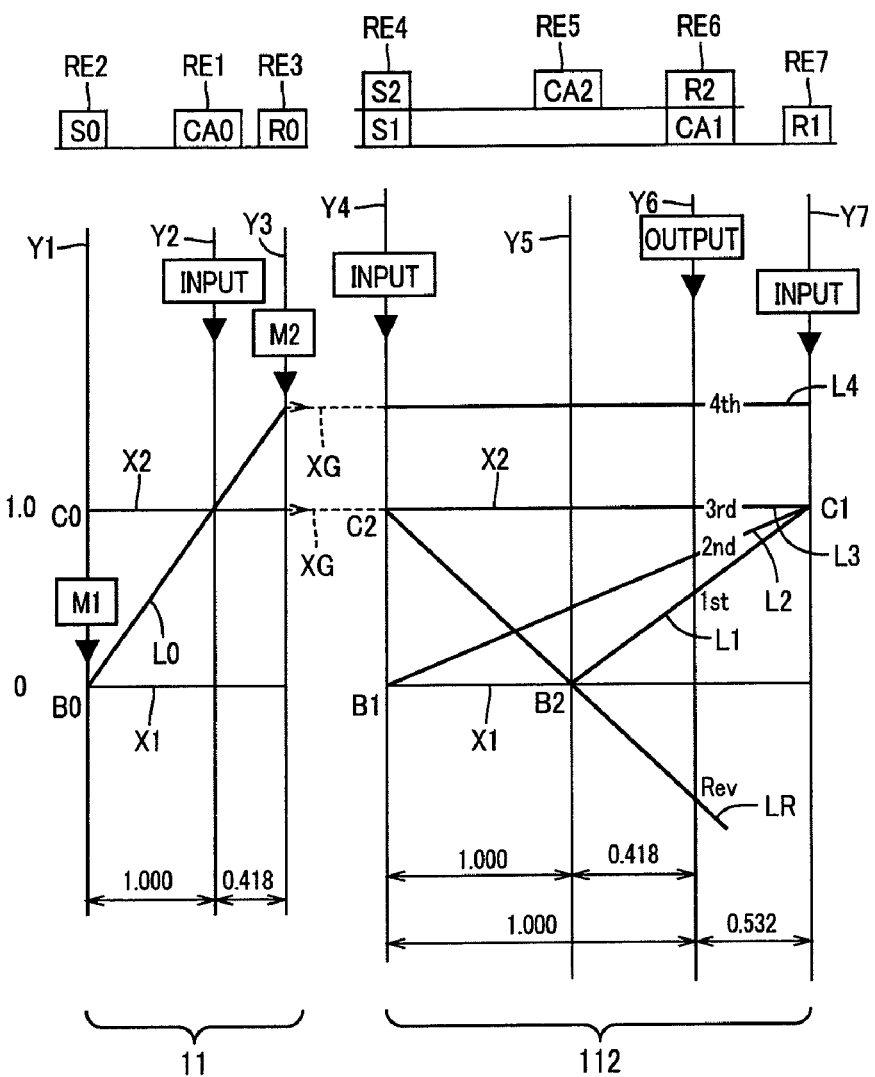
FIG. 17 is a collinear chart corresponding to that of FIG. 3, indicating the relative rotating speeds of the vehicular power transmitting system of FIG. 13 according to the second embodiment operated in the step-variable shifting state, in the different gear positions of the power transmitting system.

FIG. 15 is a schematic view for explaining an arrangement of a vehicular power transmitting system 110 (hereinafter referred to as "power transmitting system 110") according to another embodiment of the invention, and FIG. 16 is a table indicating shifting actions of the power transmitting system 110, in relation to different combinations of the operating states of hydraulically operated frictional coupling devices to effect the respective shifting actions, while FIG. 17 is a col-linear chart for explaining the shifting actions of the power transmitting system 110.

The power transmitting system 110 in FIG. 15 controlled by the control apparatus according to the present invention includes the differential portion 11 having the first electric motor M1, power distributing mechanism 16 and second electric motor M2, and further includes an automatic transmission portion 112 which is disposed between the differential portion 11 and the output shaft 22 and connected in series to the differential portion 11 and output shaft 22 through the power transmitting member 18, and which has three forward-drive positions. The power distributing mechanism 16 includes the differential-portion planetary gear set 24 of single-pinion type having a gear ratio ρ1 of about 0.418, for example, and the switching clutch C0 and the switching brake B0. The automatic transmission portion 112 includes a single-pinion type first planetary gear set 26 having a gear ratio ρ2 of about 0.532, for example, and a single-pinion type second planetary gear set 28 having a gear ratio ρ3 of about 0.418, for example. The first sun gear S1 of the first planetary gear set 26 and the second sun gear S2 of the second planetary gear set 28 are integrally fixed to each other as a unit, selectively connected to the power transmitting member 18 through the second clutch C2, and selectively fixed to the casing 12 through the first brake B1. The first carrier CA1 of the first planetary gear set 26 and the second ring gear R2 of the second planetary gear set 28 are integrally fixed to each other and fixed to the output shaft 22. The first ring gear R1 is selectively connected to the power transmitting member 18 through the first clutch C1, and the second carrier CA2 is selectively fixed to the casing 12 through the second brake B2.

In the power transmitting system 110 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 16. Those gear positions have respective speed ratios γ (input shaft speed $N_{IN}$/output shaft speed $N_{OUT}$) which change as substantially geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the differential portion 11 is operable as a transmission having fixed speed ratio or ratios, as well as in the continuously-variable shifting state in which the differential portion 11 is operable as a continuously variable transmission as described above. In the present power transmitting system 110, therefore, a step-variable state in which the power transmitting system 110 serves as a step-variable transmission is achieved by the automatic transmission portion 112, and the differential portion 11 which is placed in the fixed-speed-ratio shifting state by engagement of the switching clutch C0 or switching brake B0. Further, a continuously variable state in which the power transmitting system 110 serves as a continuously-variable transmission is achieved by the automatic transmission portion 112, and the differential portion 11 which is placed in the continuously-variable shifting state, with none of the switching clutch C0 and brake B0 being engaged. In other words, the power transmitting system 110 is switched to the step-variable shifting state, by engaging one of the switching clutch C0 and switching brake B0, and to the continuously-variable shifting state by releasing both of the switching clutch C0 and switching brake B0.

Where the power transmitting system 110 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 16. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by releasing, for example, all of the clutches C0, C1, C2 and the brakes B0, B1, B2.

When the power transmitting system 110 functions as the continuously-variable transmission, on the other hand, the switching clutch C0 and the switching brake B0 are both released, so that the differential portion 11 functions as the continuously variable transmission, while the automatic transmission portion 112 connected in series to the differential portion 11 functions as the step-variable transmission, whereby the input speed $N_{18}$ of the automatic transmission portion 112, namely, the rotating speed $N_{18}$ of the power transmitting member is continuously changed, so that the speed ratio of the power transmitting system 110 when the automatic transmission portion 112 is placed in one of those gear positions is continuously variable over a predetermined range. Accordingly, the speed ratio of the automatic transmission portion 112 is continuously variable across the adjacent gear positions, whereby the overall speed ratio γT of the power transmitting system 110 is continuously variable.

The collinear chart of FIG. 17 indicates, by straight lines, a relationship among the rotating speeds of the rotary elements in each of the gear positions of the power transmitting system 110, which is constituted by the differential portion 11 functioning as the continuously-variable shifting portion or first shifting portion, and the automatic transmission portion 112 functioning as the step-variable shifting portion or second shifting portion. The collinear chart of FIG. 17 indicates the rotating speeds of the individual elements of the differential mechanism 16 when the switching clutch C0 and brake B0 are both released, and the rotating speeds of those elements when the switching clutch C0 or switching brake B0 is engaged, as in the preceding embodiment.

In FIG. 17, four vertical lines Y4, Y5, Y6 and Y7 correspondingly to the automatic transmission portion 112 respectively represent the relative rotating speeds of a fourth rotary element (fourth element) RE4 in the form of the first and second sun gears S1, S2 integrally fixed to each other, a fifth rotary element (fifth element) RE5 in the form of the second carrier CA2, a sixth rotary element (sixth element) RE6 in the form of the first carrier CA1 and second ring gear R2 that are integrally fixed to each other, and a seventh rotary element (seventh element) RE7 in the form of the first ring gear R1. In the automatic transmission portion 112, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 112, and the seventh rotary element RE7 is selectively connected to the power transmitting member 18 through the first clutch C1.

When the first clutch C1 and the second brake B2 are engaged, the automatic transmission portion 112 is placed in the first gear position. The rotating speed of the output shaft 22 in the first gear position is represented as shown in FIG. 17, by a point of intersection between the vertical line Y6 indicative of the rotating speed of the sixth rotary element RE6 (CA1, R2) fixed to the output shaft 22 and an inclined straight line L1 which passes a point of intersection between the vertical line Y7 indicative of the rotating speed of the seventh rotary element RE7 (R1) and the horizontal line X2, and a point of intersection between the vertical line Y5 indicative of the rotating speed of the fifth rotary element RE5 (CA2) and the horizontal line X1. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA1, R2) fixed to the output shaft 22. The rotating speed of the output shaft 22 in the third speed position established by the engaging actions of the first clutch C1 and second clutch C2 is represented by a point of intersection between a horizontal straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0, the sixth rotary element RE6 is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The power transmitting system 110 according to the present embodiment is controlled by the control apparatus described above by reference to FIG. 6, and has advantages similar to those of the first embodiment.

While the preferred embodiments of this invention have been described in detail by reference to the accompanying drawings, for illustrative purpose only, it is to be understood that the present invention may be embodied with various changes and modifications which may occur to those skilled in the art.

In the illustrated embodiments, the determination by the high-load starting determining means 62 (SA2) as to whether the vehicle is in the state of high-load starting is made on the basis of the accelerator pedal operation amount $A_{CC}$ and the vehicle speed V. However, this manner of determination is not essential. For instance, the accelerator pedal operation amount $A_{CC}$ may be replaced by the angle of opening of the throttle valve 96. Alternatively, the determination that the vehicle is in the state of high-load starting may be made when the vehicle is started on an uphill road a gradient of which detected by a gradient sensor is not lower than a predetermined threshold. Further, the determination may be made on the basis of both of the throttle valve opening angle and the road gradient.

Where the vehicular power transmitting system 10 of the illustrated embodiments is arranged to circulate a lubricating oil for cooling the first electric motor M1 and the second electric motor M1 as well as the automatic transmission portion 20 and the differential portion 11, an amount of the working oil to be supplied may be increased, for example, to increase an amount of cooling by the lubricating oil, for retarding a rise of the temperatures of the first and second electric motors M1, M2, upon initiation of the control operation of the electric efficiency reducing means 80 to reduce the electric efficiency, or upon rising of the temperature of the first electric motor M1 detected by the temperature sensor 70 or the temperature of the second electric motor M2 detected by the temperature sensor 71, so that an amount of generation of heat by the first or second electric motor M1, M2 due to the control operation of the electric efficiency reducing means 80 to reduce the electric efficiency can be reduced.

In the illustrated embodiments, the vehicle speed calculating means 64 calculates the vehicle speed V on the basis of the rotating speed $N_{OUT}$ of the output shaft 22 detected by the output shaft speed sensor 66 and the speed ratio of the automatic transmission portion 20. However, this manner of calculation is not essential. The vehicle speed V may be calculated on the basis of the rotating speed of the drive wheels 38 and the rotating speed of the power transmitting member 18.

In the illustrated embodiments, the electric efficiency reduction amount calculating means 78 calculates the amount of loss Ploss depending upon the chargeable electric power Win and the vehicle load. However, this manner of calculation is not essential. For instance, the electric efficiency may be reduced by a predetermined amount of the loss Ploss. In this case, too, the reduction of the electric efficiency has an advantage according to the invention.

In the specific example illustrated in the time chart for explaining the control operation of the electric efficiency reducing means 80 to reduce the electric efficiency, the vehicle is started when the vehicle speed V is zero, that is, when the vehicle is stationary. This specific example is provided for easier understanding of the control operation, and the control operation of the electric efficiency reducing means 80 to reduce the electric efficiency may be performed when the vehicle starting takes place while the vehicle speed V is not zero.

In the illustrated embodiments, the differential portion 11 (power distributing mechanism 16) is operable as an electrically controlled continuously-variable transmission the speed ratio $\gamma 0$ of which is continuously variable from the minimum value $\gamma 0 \min$ to the maximum value $\gamma 0\max$, by controlling the operating state of the first electric motor M1. However, the speed ratio $\gamma 0$ of the differential portion 11 may be variable not continuously but in steps by utilizing its differential function.

While the engine 8 and the differential portion 11 in the illustrated power transmitting systems 10, 110 are connected directly to each other, the engine 8 may be connected to the differential portion 11 through a coupling device such as a clutch.

In the illustrated power transmitting systems 10, 110, the first electric motor M1 and the second rotary element RE2 are directly connected to each other, while the second electric motor M2 and the third rotary element RE3 are connected directly to each other. However, the first electric motor M1 and the second rotary element RE2 may be connected to each other through a coupling device such as a clutch, while the second electric motor M2 and the third rotary element RE3 may be connected to each other through a coupling device such as a clutch.

In the illustrated embodiments, the differential portion 11 is disposed between the engine 8 and the automatic transmission portion 20, 112, in the power transmitting path between the engine 8 and the drive wheels 38. However, the automatic transmission portion 20, 112 may be disposed between the engine 8 and the differential portion 11. Namely, the automatic transmission portion 20, 112 may be disposed at any position to constitute a part of in the power transmitting path between the engine 8 and the drive wheels 38.

While the differential portion 11 and the automatic transmission portion 20, 112 are connected in series with each other, these two portions need not be mechanically independent of each other in FIG. 1 of the embodiment, provided that the power transmitting system 10, 110 as a whole has a function of an electrically controlled differential device the differential state of which is electrically controllable, and a function of a transmission operable to perform shifting actions in a manner different from that of the electrically controlled differential device.

While the power distributing mechanism 16 in the illustrated embodiments is constituted by the single planetary gear set, the power distributing mechanism 16 may be constituted by two or more planetary gear sets.

In the illustrated embodiments, the engine 8 is operatively connected to the first rotary element RE1 of the differential-portion planetary gear set 24, and the first electric motor M1 is operatively connected to the second rotary element RE2, while the power transmitting path leading to the drive wheels 38 is connected to the third rotary element RE3. However, the principle of the present invention is equally applicable to a power transmitting system including a differential mechanism provided with two planetary gear sets having rotary elements some of which are connected to each other and to which the engine, electric motor and drive wheels are operatively connected, such that the differential mechanism is switchable between a step-variable shifting state and a continuously-variable shifting state by controlling clutches and brakes connected to the selected rotary elements of the planetary gear sets.

The hydraulically operated frictional coupling devices such as the switching clutch C0 and switching brake B0 in the illustrated embodiments may be replaced by magnetic-powder, electromagnetic, or any other type of mechanical coupling devices, such as powder (magnetic powder) clutches, electromagnetic clutches and meshing type dog clutches or the like.

In the illustrated embodiments, the second electric motor M2 is connected directly to the power transmitting member 18. However, the second electric motor M2 may be connected directly to a power transmitting path between the engine 8 or power transmitting member 18 and the drive wheels 38, or connected indirectly to this power transmitting path through a transmission, a planetary gear set or a coupling device or the like.

In the power distributing mechanism 16 in the illustrated embodiments, the differential-portion carrier CA0 is fixed to the engine 8, and the differential-portion sun gear S0 is fixed to the first electric motor M1, while the differential-portion ring gear R0 is fixed to the power transmitting member 18. However, this arrangement is not essential. The engine 8, first electric motor M1 and power transmitting member 18 may be fixed to any other elements selected from the three elements CA0, S0 and R0 of the differential-portion planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and the first electric motor M1 is connected to the differential-portion sun gear S0 while the second electric motor M2 is connected to the power transmitting member 18. However, this arrangement is not essential. For instance, the first and second electric motors M1, M2 may be respectively connected operatively to the differential-portion sun gear S0 and the power transmitting member 18, through gears, belts or speed reducing devices or the like.

In the illustrated embodiments, the automatic transmission portion 20, 112 is connected in series to the differential portion 11 through the power transmitting member 18. However, the automatic transmission portion 20, 112 may be disposed coaxially with a counter shaft disposed parallel to the input shaft 14. In this case, the differential portion 11 and the automatic transmission portion 20, 112 are connected to each other through a pair of power transmitting members in the form of a pair of counter gears, or sprockets and a chain, such that a rotary motion can be transmitted between the differential portion 11 and the automatic transmission portion 20, 112 as the power transmitting member 18.

While the power distributing mechanism 16 in the illustrated embodiments is constituted by one differential-portion planetary gear set 24, it may be constituted by two or more planetary gear sets so that the power distributing mechanism 16 is operable as a transmission having three or more gear positions in the non-differential state (fixed-speed-ratio shifting state).

In the illustrated embodiments, the second electric motor M2 is connected to the power transmitting member 18 which constitutes a part of the power transmitting path between the engine 8 and the drive wheels 34. However, the power transmitting systems 10, 110 may be modified such that the second electric motor M2 which is connected to the above-indicated power transmitting path is connected to the power distributing mechanism 16 through a clutch or any other coupling device, so that the differential state of the power distributing mechanism 16 can be controlled by controlling the operating state of the second electric motor M2 rather than the first electric motor M1.

In the illustrated embodiments, the power distributing mechanism 16 is provided with the switching clutch C0 and the switching brake B0. However, the power transmitting system 10 may be modified such that the switching clutch C0 and switching brake B0 are independent of the power distributing mechanism 16. Either one or both of the switching clutch C0 and switching brake B0 may be eliminated. Where both of the switching clutch C0 and brake B0 are not provided, the differential control means 88 does not control slipping actions of the switching clutch C0 and brake B0, but other means constituting the electric efficiency reducing means 80 has the same advantages as described above.

In the illustrated power transmitting systems 10, 110, the differential portion 11 is provided with the first and second electric motors M1, M2. However, the first and second electric motors M1, M2 may be provided in the power transmitting systems 10, 110, such that the motors M1, M2 are disposed separately from the differential portion 11.

It is to be understood that the present invention may be embodied with any other changes not illustrated, without departing from the scope of the present invention.

The invention claimed is:

1. A control apparatus for a vehicular power transmitting system including
an electrically controlled differential portion having a differential mechanism connected to a power transmitting path between an engine and a drive wheel of a vehicle, and
a first electric motor operatively connected to said differential mechanism such that a differential state of said differential mechanism is controllable by controlling an operating state of said first electric motor,
a second electric motor operatively connected to said drive wheel, and
a transmission portion which constitutes a part of said power transmitting path,
wherein said electrically controlled differential portion is provided with a differential limiting device configured to disable and enable said differential mechanism to perform a differential action, for thereby switching said vehicular power transmitting system between a step-variable shifting state in which the speed ratio is variable in steps, and a continuously-variable shifting state in which the speed ratio is continuously variable, said control apparatus being characterized by comprising:
electric efficiency reducing unit that reduces an electric efficiency of at least one of said first electric motor and said second electric motor, when an input of an electric energy into a chargeable electric-energy storage device is restricted, during an operation of said engine to provide a vehicle drive force and generation of the electric energy by at least one of said first electric motor and said second electric motor,
wherein the electric efficiency reducing unit includes differential control unit that places said differential limiting device in a slipping state when a sufficient vehicle drive force cannot be obtained by the reduction of said electric efficiency.

2. The control apparatus according to claim 1, wherein said electric efficiency reducing unit reduces said electric efficiency by an amount which increases with an increase of a load of the vehicle.

3. The control apparatus according to claim 1, wherein said electric efficiency reducing unit reduces said electric efficiency by an amount which increases with a decrease of a permissible amount of input of the electric energy into said electric-energy storage device.

4. The control apparatus according to claim 1, wherein said electric efficiency reducing unit reduces said electric efficiency for a period of time from a moment of starting of the vehicle to a moment at which the vehicle speed has been raised to a predetermined reduction termination threshold value.

5. The control apparatus according to claim 1, wherein said electric efficiency reducing unit reduces said electric efficiency while the engine is in a predetermined range of its torque.

6. The control apparatus according to claim 1, wherein said electric efficiency reducing unit reduces said electric efficiency by changing a manner of application of an electric current to said at least one of the first electric motor and the second electric motor.

7. The control apparatus according to claim 1, wherein said electric efficiency reducing unit reduces said electric efficiency by changing an operating point of said at least one of the first electric motor and the second electric motor.

* * * * *